US006866706B2

(12) United States Patent
Ishida et al.

(10) Patent No.: US 6,866,706 B2
(45) Date of Patent: Mar. 15, 2005

(54) INK FOR THERMAL TRANSFER, SHEET FOR THERMAL TRANSFER, AND THERMAL TRANSFER RECORDING METHOD USING THE SAME

(75) Inventors: Mio Ishida, Kanagawa (JP); Yukichi Murata, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 6 days.

(21) Appl. No.: 10/287,487

(22) Filed: Nov. 5, 2002

(65) Prior Publication Data

US 2003/0183122 A1 Oct. 2, 2003

(30) Foreign Application Priority Data

Nov. 5, 2001 (JP) .................................... P. 2001-339584
Nov. 21, 2001 (JP) .................................... P. 2001-356289

(51) Int. Cl.[7] ........................... C09D 11/00; B05D 1/26; B32B 27/14

(52) U.S. Cl. ............................... 106/31.47; 106/31.49; 106/31.5; 428/32.6; 428/32.36; 427/466

(58) Field of Search ........................... 106/31.47, 31.49, 106/31.5, 31.27; 428/32.6, 32.39; 427/466; 503/227

(56) References Cited

U.S. PATENT DOCUMENTS

| | | | | | |
|---|---|---|---|---|---|
| 4,388,115 | A | * | 6/1983 | Sugiyama et al. | 524/105 |
| 4,820,685 | A | | 4/1989 | Murata | 503/227 |
| 4,866,029 | A | | 9/1989 | Evans et al. | 503/227 |
| 4,946,825 | A | | 8/1990 | Evans et al. | 503/227 |
| 4,981,837 | A | | 1/1991 | Tanaka et al. | 503/227 |
| 5,041,411 | A | | 8/1991 | Chapman et al. | 503/227 |
| 5,081,101 | A | | 1/1992 | Evans et al. | 503/227 |
| 5,382,561 | A | * | 1/1995 | Mori et al. | 503/227 |
| 5,858,628 | A | * | 1/1999 | Yoshida et al. | 430/338 |
| 6,063,729 | A | * | 5/2000 | Eguchi et al. | 503/227 |
| 6,713,432 | B2 | * | 3/2004 | Ikemizu et al. | 503/227 |
| 2003/0117474 | A1 | * | 6/2003 | Harada et al. | 347/100 |
| 2003/0165668 | A1 | * | 9/2003 | Yukawa et al. | 428/195.1 |

FOREIGN PATENT DOCUMENTS

| | | | |
|---|---|---|---|
| JP | 63-189289 | | 8/1988 |
| JP | 1-225592 | | 9/1989 |
| JP | 2-003450 | | 1/1990 |
| JP | 4-265792 | | 9/1992 |
| JP | 4-275184 | | 9/1992 |
| JP | 2000/103174 | * | 4/2000 |

OTHER PUBLICATIONS

Derwent abstract of JP2000/103174, Apr. 2000.*

* cited by examiner

*Primary Examiner*—Helene Klemanski
(74) *Attorney, Agent, or Firm*—Oblon, Spivak, McClelland, Maier & Neustadt, P.C.

(57) ABSTRACT

A thermal transfer ink is provided, which includes:

at least one dye (a);

at least one dye selected from the group including dye (b), dye (c) and a mixture thereof; and a medium; wherein (a) is a dye having a pyrazolone methine skeleton, (b) is a dye having a quinophthalone skeleton, and (c) is a dye having an aminopyrazole azo skeleton.

15 Claims, No Drawings

INK FOR THERMAL TRANSFER, SHEET FOR THERMAL TRANSFER, AND THERMAL TRANSFER RECORDING METHOD USING THE SAME

BACKGROUND OF THE INVENTION

1. Field of the Invention

The present invention relates to an ink for thermal transfer recording, especially thermal transfer recording of dye-transferring type, a sheet for thermal transfer recording, and a thermal transfer recording method using the same, and a sheet set for thermal transfer recording containing the sheet for thermal transfer recording and a full color printing method using the same.

2. Background of the Invention

In dye-transferring thermal transfer recording, a thermal transfer sheet having a base film and a color material layer containing a thermally transferable dye formed on the base film is overlaid on an image-receiving sheet having a dye-receiving layer on its surface, and the thermal transfer sheet is heated to transfer the dye from the thermal transfer sheet to the image-receiving sheet and thereby to carry out recording. This recording method is applicable to full color image recording by video printers and the like. It is possible with this method to control the amount of dye transferred by controlling the quantity of the thermal energy. Thus, gradation expression is possible.

In these dye-transferring thermal transfer recording methods, the dye properties of the dye in the thermal transfer sheet and the ink composition for the thermal transfer sheet are very important, because the dye substantially influences the speed of the thermal transfer recording, the image quality, and storage stability of recorded products. Such a dye needs to satisfy the following requirements.

(1) It readily sublimates and/or thermally diffuses under the operation of the thermal recording head.

(2) It does not undergo thermal decomposition under the operation of the thermal recording head.

(3) It has a desirable hue for color reproduction.

(4) It has a large molecular extinction coefficient.

(5) It is stable against heat, light, moisture, chemicals, etc.

(6) It is easy to synthesize.

(7) It is suitable for preparation of an ink.

(8) It is safe.

Heretofore, various dyes for thermal transfer recording have been disclosed in JP-A No. 3450/1990, No. 265792/1992, and No. 275184/1992. These references disclose as a yellow dye, a pyrazolone methine dye represented by the general formula (I) having a basic skeleton similar to the dye for use in the invention as a dye for thermal transfer recording in a sublimation method. JP-A No. 265792/1992 describes a combination of a pyrazolone methine dye and a specific dicyanomethine yellow dye. JP-A No. 275184/1992 describes a combination of a pyrazolone methine dye and a specific pyridone azo yellow dye. A quinophthalone dye is described in JPA No. 189289/1988, and an aminopyrazole azo dye is disclosed in JP-A No. 225592/1989.

However, the dyes or dye mixtures disclosed above do not perform sufficiently, and this is clear from the Comparative Examples mentioned below. Therefore, there is still a need for an ink for thermal transfer and a sheet for thermal transfer, which excel as a dye for thermal transfer recording, which exhibit a high recording density, which produce recorded products having a clear color tone, and which result in highly stable recorded products.

SUMMARY OF THE INVENTION

Accordingly, one object of the invention is to provide an ink for thermal transfer, a sheet for thermal transfer, and a thermal transfer recording method, which exhibit excellent performance in all of the above properties (1) to (8) in thermal transfer recording.

Another object of the invention is to provide an ink for thermal transfer, a sheet for thermal transfer, and a thermal transfer recording method which exhibit a high recording density.

Another object of the invention is to provide an ink for thermal transfer, a sheet for thermal transfer, and a thermal transfer recording method which produce recorded products having a clear color tone.

Another object of the invention is to provide an ink for thermal transfer, a sheet for thermal transfer, and a thermal transfer recording method which result in highly stable recorded products.

These and other objects have been achieved by the present invention, the first embodiment of which provides a thermal transfer ink, which includes:

at least one dye (a);

at least one dye selected from the group including dye (b), dye (c) and a mixture thereof; and a medium; wherein (a) is a dye having a pyrazolone methine skeleton, (b) is a dye having a quinophthalone skeleton, and (c) is a dye having an aminopyrazole azo skeleton.

Another embodiment of the present invention provides a thermal transfer sheet, which includes:

a substrate, and on the substrate, a color material layer that includes:

- a binder;
- at least one dye (a); and
- at least one dye selected from the group including dye (b), dye (c) and a mixture thereof; wherein
- (a) is a dye having a pyrazolone methine skeleton,
- (b) is a dye having a quinophthalone skeleton, and
- (c) is a dye having an aminopyrazole azo skeleton.

Another embodiment of the present invention provides a thermal transfer recording method, which includes thermally transferring an image using the above-identified sheet.

Another embodiment of the present invention provides a thermal transfer sheet set, which includes:

at least one substrate;

a yellow color material layer on the substrate; and on the substrate, or on separate substrates:

- a magenta color material layer and a cyan color material layer;

wherein each color material layer includes at least one thermally transferable dye and a binder;

wherein the thermally transferable dye in the yellow color material layer includes:

- at least one dye (a), and
- at least one dye selected from the group including dye (b), dye (c) and a mixture thereof, wherein
- (a) is a dye having a pyrazolone methine skeleton,
- (b) is a dye having a quinophthalone skeleton, and
- (c) is a dye having an aminopyrazole azo skeleton;

wherein the thermally transferable dye in the magenta color material layer includes at least one dye selected from the group including dyes represented by the following formulae (TV) to (IX) and combinations thereof;

and wherein the thermally transferable dye in the cyan color material layer includes at least one dye selected from the group including dyes represented by the following formulae (X) to (XIV) and combinations thereof:

(IV)

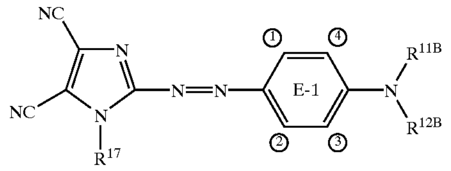

(V)

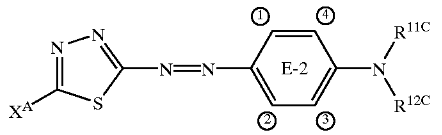

(VI)

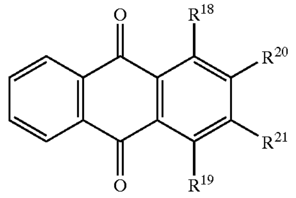

(VII)

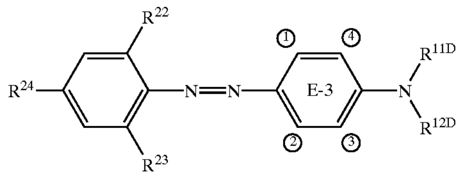

(VIII)

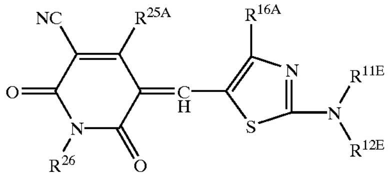

(IX)

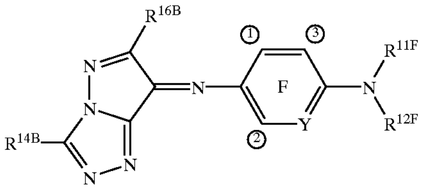

(X)

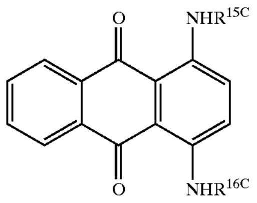

-continued (XI)

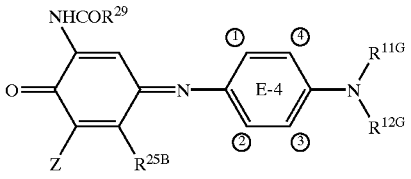

(XII)

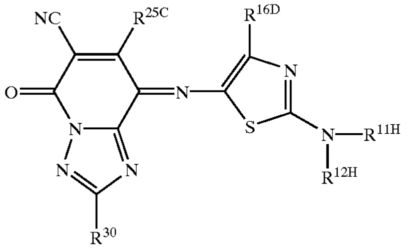

(XIII)

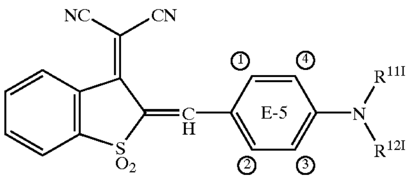

(XIV)

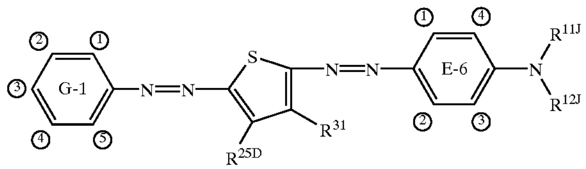

wherein rings E-1 to E-6 and G-1 each represents an optionally substituted benzene ring, ring F represents an optionally substituted benzene ring or an optionally substituted pyridine ring, $R^{11B}$ to $R^{11J}$ and $R^{12B}$ to $R^{12J}$ each independently represents hydrogen atom, an optionally substituted alkyl group, an allyl group, an optionally substituted aryl group, or an optionally substituted cycloalkyl group, $R^{14B}$ represents an optionally substituted alkyl group or an optionally substituted aryl group, $R^{15C}$ and $R^{16A}$ to $R^{16D}$ each independently represents hydrogen atom, an optionally substituted alkyl group, or an optionally substituted aryl group, $R^{17}$ represents hydrogen atom, an optionally substituted alkyl group, an allyl group, or an optionally substituted aryl group, $R^{18}$ and $R^{19}$ each independently represents amino group or hydroxy group, $R^{20}$ and $R^{21}$ each independently represents hydrogen atom or an optionally substituted aryloxy group, $R^{22}$ and $R^{23}$ each independently represents cyano group, nitro group, an optionally substituted alkyl group, a halogen atom, or hydrogen atom, $R^{24}$ represents hydrogen atom, halogen atom, nitro group, or an optionally substituted alkyl group, $R^{25A}$ to $R^{25D}$ each independently represents hydrogen atom or an optionally substituted alkyl group, $R^{26}$ represents an optionally substituted alkyl group, an optionally substituted cycloalkyl group, or an $NR^{27}R^{28}$ group in which $R^{27}$ and $R^{28}$ each independently represents an optionally substituted alkylcarbonyl group or an optionally substituted arylcarbonyl group, $R^{29}$ represents an optionally substituted alkyl group, an optionally substituted alkoxy group, an optionally substituted aryl group, or an optionally substituted aryloxy group, $R^{30}$ represents an optionally substituted alkyl group, an optionally substituted aryl group, or hydroxy group, $R^{31}$ represents cyano group, a $COOR^{15G}$ group, or a $CONR^{15H}HR^{16H}$ group in which $R^{15G}$, $R^{15H}$ and $R^{16H}$ each independently represents hydrogen atom, an optionally substituted alkyl group, or an optionally substituted aryl group, $X^A$ represents an $SR^{14C}$ group, an $S(O)R^{14D}$ group, or an $SO_2R^{14E}$ group in which $R^{14C}$ to $R^{14E}$ each independently represents an optionally substituted alkyl group or an optionally substituted aryl group, Y represents CH group or N, and Z represents hydrogen atom or a halogen atom.

Another embodiment of the present invention provides a full color printing method, which includes carrying out full color thermal transfer recording on at least one support using the above-identified sheet set.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Preferably, the thermal transfer recording method of the invention includes carrying out thermal transfer recording using such a sheet for thermal transfer of the invention, wherein a recorded image has an a* value of −13 to 10 and a b* value of 60 or more in CIELAB space at a color density of 1.0 in the case of setting at 2° sight angle using D50 light source.

Preferably, the sheet set for thermal transfer of the invention includes, on a substrate, a color material layer containing a dye having a pyrazolone methine skeleton and a dye having a quinophthalone skeleton and/or a dye having an aminopyrazole azo skeleton, and further includes at least color material layers of magenta and cyan.

Preferably, the full color printing method of the invention uses a sheet set for thermal transfer including, on a substrate, a color material layer containing a dye having a pyrazolone methine skeleton and a dye having a quinophthalone skeleton and/or a dye having an aminopyrazole azo skeleton, and further including at least color material layers of magenta and cyan.

As a result of the intensive studies on a yellow dye mixture for thermal transfer recording, the present inventors have surprisingly and unexpectedly found that recorded products excelling in the properties of a high recording density, a clear color tone of the recorded products, and a high stability of the recorded products, as compared with the conventional recorded products, can be obtained by using an ink of the present invention. Preferably, the ink contains a dye of having a pyrazolone methine skeleton of the following formula (A) in combination with a dye having a quinophthalone skeleton of the following formula (B) and/or a dye having an aminopyrazole azo skeleton of the following formula (C):

(A)

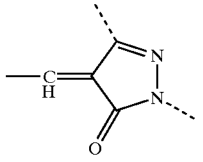

(B)

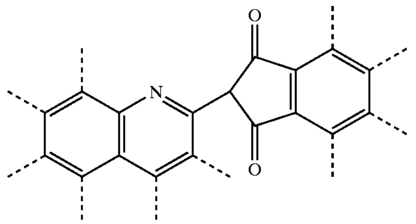

(C)

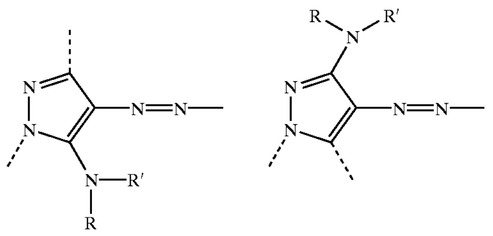

In the above formulae, a dotted line represents unsubstitution or the presence of a substituent and —NRR' represents amino group or a substituted amino group.

In addition, one of the skeletons represented by the formula (C) is a positional isomer formed as a byproduct at the time when another one is synthesized.

Namely, the dye having the pyrazolone methine skeleton is highly sensitive in thermal transfer recording but the dye is tinged with red as a yellow dye, so that it is insufficient in view of color tone. By using such a dye having a pyrazolone methine skeleton in combination with a dye having a quinophthalone skeleton and/or a dye having an aminopyrazole azo skeleton, a dye excelling in the properties of color tone, sensitivity, light resistance, and the like is obtained. This is because the dye having the quinophthalone skeleton and the dye having the aminopyrazole azo skeleton show greenish yellow color tone and hence the redness of the dye having the pyrazolone methine skeleton can be reduced and sensitivity and light resistance can be still maintained.

Preferably, in each of the groups and substituents described in the invention throughout this application, each range of carbon numbers includes all values and subranges therebetween, including 1, 2, 3, 4, 5, 6, 7, 8, 9, 10, 11, and 12 as appropriate for each given range.

The ink and sheet for thermal transfer of the invention are suitable as a yellow ink for thermal transfer and a yellow sheet for thermal transfer, and those wherein maximum absorption wavelength ($\lambda_{max}$) of the dye corresponds from 350 to 480 nm can be suitably obtained.

First, the dye having the pyrazolone methine skeleton, the dye having the quinophthalone skeleton, and the dye having the aminopyrazole azo skeleton for use in the invention will be explained.

In the case that an exemplified group has one or more substituent(s), the preferred carbon number of the group is a total carbon number including the carbon number of the substituent.

The dye having the pyrazolone methine skeleton for use in the invention is preferably a pyrazolone methine dye represented by the following general formula (I). In the following general formula, ① to ④ may represent the positions of substituent(s) of ring A.

(I)

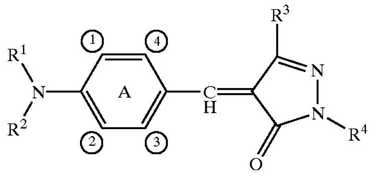

In the general formula (I), ring A represents benzene ring which may have any substituent(s) and is preferably benzene ring which may have substituent(s) selected from the group including an alkyl group having 1 to 10 carbon atoms which may be substituted, an alkoxy group having 1 to 10 carbon atoms which may be substituted, and a halogen atom. In the case that the benzene ring is substituted, the position for substitution may be any of 1-position to 4-position (the positions of ① to ④, and is preferably 3-position (the position of ③).

$R^1$ and $R^2$ each independently represents hydrogen atom, an alkyl group which may be substituted, allyl group, an aryl group which may be substituted, or a cycloalkyl group which may be substituted, and is preferably an alkyl group having 1 to 12 carbon atoms which may be substituted, allyl group, an aryl group having 6 to 10 carbon atoms which may be substituted, or a cycloalkyl group having 5 to 7 carbon atoms which may be substituted, $R^3$ represents hydrogen atom, an alkyl group which may be substituted, an $NR^9R^{10}$ group, an alkoxy group which may be substituted, an alkoxycarbonyl group which may be substituted, an aryl group which may be substituted, or a $C(O)NR^{9A}R^{10A}$ group, and is preferably hydrogen atom, an alkyl group having 1 to 10 carbon atoms which may be substituted, an $NR^9R^{10}$ group having 1 to 8 carbon atoms, an alkoxy group having 1 to 8 carbon atoms which may be substituted, an alkoxycarbonyl group having 2 to 9 carbon atoms which may be substituted, an aryl group having 6 to 10 carbon atoms which may be substituted, or a $C(O)NR^{9A}R^{10A}$ group having 3 to 9 carbon atoms, and $R^4$ represents an alkyl group which may be substituted or an aryl group which may be substituted, and is preferably an alkyl group having 1 to 12 carbon atoms which may be substituted or an aryl group having 6 to 10 carbon atoms which may be substituted.

In this connection, $R^9$, $R^{10}$, $R^{9A}$, and $R^{10A}$ each independently represents hydrogen atom, an alkyl group which may be substituted, or an aryl group which may be substituted, and is preferably hydrogen atom, an alkyl group having 1 to 10 carbon atoms which may be substituted or an aryl group having 6 to 10 carbon atoms which may be substituted.

In particular, $R^1$ and $R^2$ each independently is preferably a linear or branched alkyl group having 1 to 8 carbon atoms, $R^3$ is preferably a linear or branched alkoxy group having 1 to 4 carbon atoms, a linear or branched dialkylamino group having 1 to 8 carbon atoms, or a linear or branched alkoxycarbonyl group having 2 to 9 carbon atoms, and $R^4$ is preferably phenyl group or phenyl group having a halogen atom as a substituent.

The dye having the quinophthalone skeleton for use in the invention is preferably a quinophthalone dye represented by the following general formula (II).

In the following general formula, ① to ④ represent the positions for substitution of rings B and C.

Moreover, the quinophthalone dye represented by the following general formula (II) includes the structure represented by the following general formula (II), the structure represented by the following general formula (IIa), and the structure represented by the following general formula (II-b), and an intermediary structure thereof, because hydrogen atom binds to a conjugated other atom owing to delocalization of electrons. Namely, the quinophthalone dye represented by the following general formula (II) includes all the structures represented by the following general formula (II-x) which shows that hydrogen atom binds to a conjugated other atom owing to delocalization of electrons (in the following general formula (II-x), a dashed line part represents a delocalized part of electrons). In the invention, according to the conventional notation, as a representative of the quinophthalone dyes which may be represented by all these structures, the following general formula (II) is employed. Therefore, the quinophthalone dye represented by the following general formula (II) for use in the invention is not limited to the quinophthalone dye represented by the following general formula (II) but may be any of the forms represented by the following general formula (II-x) including the structures represented by the following general formulae (II-a) and (II-b) and an intermediary structure thereof.

Similarly, the quinophthalone skeleton represented by the above formula (B) may be a skeleton represented by the following formulae (B-a) or (B-b) or a skeleton having an intermediary structure of the above (B) and the following (B-a) and (B-b), and includes all the structures represented by the following formula (B-x) which shows that hydrogen atom binds to a conjugated other atom owing to delocalization of electrons (in the following general formula (B-x), a dashed line part represents a delocalized part of electrons). In the present invention, according to the conventional notation, as a representative of the quinophthalone skeletons which may be represented by all these structures, the above formula (B) is employed. Therefore, the quinophthalone skeleton represented by the above formula (B) is not limited to the quinophthalone skeleton represented by the following formula (B) but may be any of the forms represented by the following formula (B-x) including the structures represented by the following formulae (B-a) and (B-b) and an intermediary structure thereof.

(II)

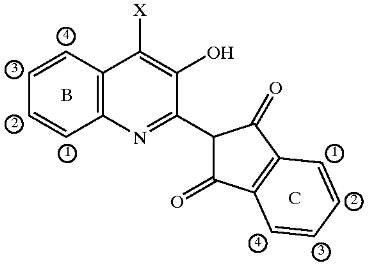

-continued (II-a)

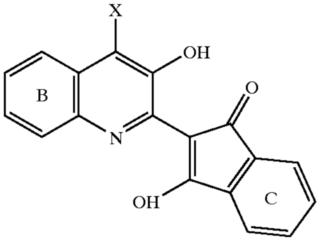

(II-b)

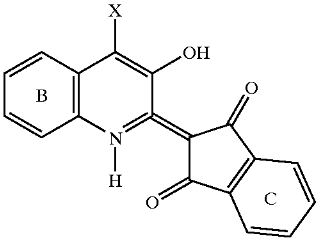

(II-x)

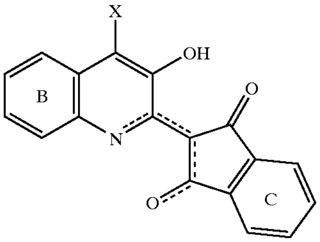

(B-a)

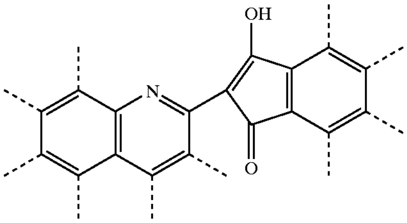

(B-b)

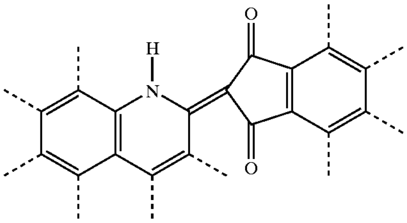

(B-x)

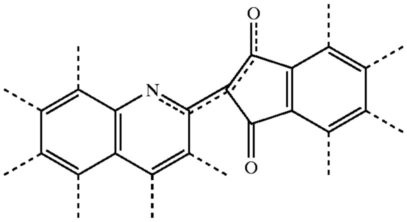

In the general formula (II), rings B and C each independently represents benzene ring which may have any substituent(s) and X represents hydrogen atom or a halogen atom.

Preferably, ring B is benzene ring which may have alkyl group(s) each having 1 to 8 carbon atoms which may be substituted. In the case that the benzene ring is substituted, the position for substitution may be any of 1-position to 4-position (the positions of ① to ④, and is preferably 3-position (the position of ③) or 4-position (the position of ④).

Ring C is preferably benzene ring substituted by substituent(s) selected from the group including an alkyl group having 1 to 10 carbon atoms, particularly 2 to 8 carbon atoms, which may be substituted, an alkoxy group having 1 to 12 carbon atoms, particularly 2 to 8 carbon atoms, which may be substituted, an aryl group having 6 to 10 carbon atoms which may be substituted, an aryloxy group having 6 to 10 carbon atoms which may be substituted, a $COOR^{9D}$ group having 2 to 11 carbon atoms, particularly 3 to 9 carbon atoms, which may be substituted, a $C(O)NR^{9E}R^{10E}$ group having 3 to 9 carbon atoms, and an $OC(O)R^{9F}$ group having 2 to 11 carbon atoms, particularly 3 to 9 carbon atoms. The positions of substituent(s) in the benzene ring of ring C may be any of 1-position to 4-position (the positions of ① to ④) and is preferably 1-position (the position of ①) or 2-position (the position of ②).

$R^{9D}$, $R^{9E}$, and $R^{10E}$ each independently represents hydrogen atom, an alkyl group which may be substituted, or an aryl group which may be substituted, and is preferably hydrogen atom, an alkyl group having 1 to 10 carbon atoms which may be substituted, or an aryl group having 6 to 10 carbon atoms which may be substituted, and $R^{9F}$ represents hydrogen atom, an alkyl group which may be substituted, an aryl group which may be substituted, an alkoxy group which may be substituted, an aryloxy group which may be substituted, or an NR*R** group which may be substituted, and is preferably hydrogen atom, an alkyl group having 1 to 10 carbon atoms which may be substituted, an aryl group having 6 to 10 carbon atoms which may be substituted, an alkoxy group having 1 to 10 carbon atoms which may be substituted, an aryloxy group having 6 to 10 carbon atoms which may be substituted, or an NR*R** group having 1 to 16 carbon atoms, in which R* and R** each independently represents hydrogen atom, an alkyl group which may be substituted, or an aryl group which may be substituted, and is preferably an alkyl group having 1 to 10 carbon atoms which may be substituted or an aryl group having 6 to 10 carbon atoms which may be substituted.

In particular, ring B is preferably benzene ring having no substituent or benzene ring having a linear or branched alkyl group having 1 to 8 carbon atoms as a substituent, ring C is preferably benzene ring having a $COOR^{9D}$ group, a $C(O)NR^{9E}R^{10E}$ group, or an $OC(O)R^{9F}$ group as substituent(s), and X is preferably hydrogen atom or bromine atom.

The dye having an aminopyrazole azo skeleton for use in the invention is preferably an aminopyrazole azo dye represented by the following general formula (III). In the following general formula, ① to ⑤ represent the positions of substituent(s) of ring D.

(III)

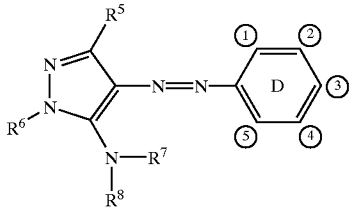

In the general formula (III), ring D represents benzene ring which may have any substituent(s), and is preferably benzene ring which may be substituted by substituent(s)

selected from the group including an alkyl group having 1 to 10 carbon atoms, particularly 1 to 6 carbon atoms, which may be substituted, an alkoxy group having 1 to 10 carbon atoms, particularly 1 to 6 carbon atoms, which may be substituted, a halogen atom, cyano group, nitro group, or a $COOR^{9G}$ group having 2 to 11 carbon atoms, particularly 2 to 9 carbon atoms, in which $R^{9G}$ represents hydrogen atom, an alkyl group having 1 to 10 carbon atoms which may be substituted, or an aryl group having 6 to 10 carbon atoms which may be substituted, In the case that the benzene ring of ring D is substituted, the position for substitution may be any of 1position to 5-position (the positions of ① to ⑤), and is preferably 1-position (the position of ①) and/or 3-position (the position of ③).

$R^5$ represents hydrogen atom, an alkyl group which may be substituted, an alkoxy group which may be substituted, an aryl group which may be substituted, an alkoxycarbonyl group which may be substituted, a $C(O)NR^{9B}R^{10B}$ group, or an $SO_2R^{9C}$ group, and is preferably hydrogen atom, an alkyl group having 1 to 10 carbon atoms which may be substituted, an alkoxy group having 1 to 10 carbon atoms which may be substituted, an aryl group having 6 to 19 carbon atoms which may be substituted, an alkoxycarbonyl group having 2 to 10 carbon atoms which may be substituted, a $C(O)NR^{9B}R^{10B}$ group having 2 to 9 carbon atoms, or an $SO_2R^{9C}$ group having 1 to 8 carbon atoms, $R^6$ represents hydrogen atom, an alkyl group which may be substituted, or an aryl group which may be substituted, and is preferably an alkyl group having 1 to 10 carbon atoms which may be substituted or an aryl group having 6 to 10 carbon atoms which may be substituted, and $R^7$ and $R^8$ each independently represents hydrogen atom or an alkyl group which may be substituted, and is preferably hydrogen atom or an alkyl group having 1 to 10 carbon atoms which may be substituted.

$R^{9B}$, $R^{9C}$, and $R^{10B}$ each independently represents hydrogen atom, an alkyl group which may be substituted, or an aryl group which may be substituted, and the alkyl group is preferably a group having 1 to 10 carbon atoms and the aryl group is preferably a group having 6 to 10 carbon atoms.

Particularly, ring D is preferably benzene ring which may be substituted by substituent(s) selected from the group including a linear or branched alkyl group having 1 to 4 carbon atoms, a halogen atom, trifluoromethyl group, cyano group, and nitro group. Moreover, $R^5$ is preferably a linear or branched alkyl group having 1 to 8 carbon atoms, $R^6$ is preferably phenyl group or phenyl group having a halogen atom, and $R^7$ and $R^8$ each independently is preferably hydrogen atom or a linear or branched alkyl group having 1 to 8 carbon atoms.

In this connection, in the general formulae (I) to (III), the alkyl group as a substituent for $R^1$ to $R^8$, $R^9$, $R^{9A}$, $R^{9B}$, $R^{9C}$, $R^{9D}$, $R^{9E}$, $R^{9F}$, $R^{9G}$, $R^{10}$, $R^{10A}$, $R^{10B}$, $R^{10E}$, or rings A to D may be an linear or branched alkyl group having 1 to 12 carbon atoms, preferably 1 to 10 carbon atoms, and specifically includes methyl group, ethyl group, n-propyl group, i-propyl group, n-butyl group, i-butyl group, t-butyl group, n-hexyl group, n-octyl group, 2-ethylhexyl Group, or the like.

In the case that the alkyl group is substituted, the substituent may be a halogen atom, an alkoxy group, an aryl group, cyano group, an aryloxy group, an alkoxycarbonyl group, an aryloxycarbonyl group, or the like, and particularly, the carbon number of the alkyl group having substituent(s) is preferably from 1 to 8.

The substituted alkyl group may be the following: an alkoxy group-substituted alkyl group such as 2-ethoxyethyl group, 2-n-propoxyethyl group, 2-n-butoxyethyl group, 4-i-propoxybutyl group, or 3-i-butoxypropyl group; a halogen group-substituted alkyl group such as 2-chloroethyl group, 4-chlorobutyl group, or trifluoromethyl group; a cyano group-substituted alkyl group such as cyanoethyl group; an aryl group-substituted alkyl group such as benzyl group, 2-phenylethyl group, or p-chlorobenzyl group; an aryloxy group-substituted alkyl group such as phenoxymethyl group, 2-phenoxyethyl group, or 4-phenoxy group; an alkoxycarbonyl group-substituted or allyloxycarbonyl group-substituted alkyl group such as 2-methoxycarbonylethyl group, 3-n-butoxycarbonylpropyl group, or 2-allyloxycarbonylethyl group; an aryloxycarbonyl group-substituted alkyl group such as 2-phenoxyoxycarbonylethyl group or 4-p-chlorophenoxycarbonylbutyl group; an aralkyloxy group-substituted alkyl group such as 2-benzyloxyethyl group or 4-benzyloxybutyl group; an acyloxy group-substituted alkyl group such as 2-acetoxyethyl group, 2-benzoyloxyethyl group, or 4-acetoxybutyl group.

The aryl group as a substituent for $R^1$ to $R^6$, $R^9$, $R^{9A}$, $R^{9B}$, $R^{9C}$, $R^{9D}$, $R^{9E}$, $R^{9F}$, $R^{9G}$, $R^{10}$, $R^{10A}$, $R^{10B}$, $R^{10E}$, ring C, or the like may be phenyl group having substituent(s) such as a linear or branched alkyl group having 1 to 8 carbon atoms, a halogen atom such as fluorine atom, chlorine atom, or bromine atom, a fluoroalkyl group having 1 to 4 carbon atoms, or a linear or branched alkoxy group having 1 to 8 carbon atoms.

The cycloalkyl group for $R^1$ or $R^2$ may be an cycloalkyl group having 5 to 7 carbon atoms such as cyclopentyl group or cyclohexyl group.

The alkoxy group as a substituent for $R^3$, $R^5$, or ring C may be alkoxy group having 1 to 12 carbon atoms, preferably 1 to 8 carbon atoms, such as methoxy group, ethoxy group, n-propoxy group, i-propyloxy group, n-butyloxy group, i-butyloxy group, s-butyloxy group, t-butyloxy group, n-hexyloxy group, n-octyloxy group, s-octyloxy group, or 2-ethylhexyloxy group.

In the case that the alkoxy group is substituted, the substituent may be a halogen atom, an alkoxy group, an aryl group, cyano group, an aryloxy group, an alkoxycarbonyl group, and an aryloxycarbonyl group, and the substituted alkoxy group may be a linear or branched alkoxy group having any of these substituents and having 1 to 12 carbon atoms, preferably 1 to 8 carbon atoms.

The alkoxycarbonyl group for $R^3$ or $R^5$ may be alkoxycarbonyl groups having 2 to 12, preferably 2 to 10 carbon atoms, such as methoxycarbonyl group, ethoxycarbonyl group, n-propoxycarbonyl group, i-propyloxycarbonyl group, n-butyloxycarbonyl group, i-butyloxycarbonyl group, t-butyloxycarbonyl group, n-hexyloxycarbonyl group, n-octyloxycarbonyl group, or 2-ethylhexyloxycarbonyl group.

In the case that the alkoxycarbonyl group is substituted, the substituent may be a halogen atom, an alkoxy group, an aryl group, cyano group, an aryloxy group, an alkoxycarbonyl group, or an aryloxycarbonyl group, and the substituted alkoxycarbonyl group may be a linear or branched alkoxycarbonyl group having any of these substituents and having 2 to 12 carbon atoms, preferably 2 to 10 carbon atoms.

The halogen atom for X or the halogen atom as a substituent for ring A, D, or other groups may be fluorine atom, chlorine atom, bromine atom, or the like.

The aryloxy group as a substituent for $R^{9F}$, ring C or other groups includes phenyloxy group which may have, as substituent(s), a linear or branched alkyl group having 1 to 8 carbon atoms, a halogen atom such as fluorine atom, chlorine atom, or bromine atom, a fluoroalkyl group having 1 to 4 carbon atom, and/or a linear or branched alkoxy group having 1 to 8 carbon atoms.

In the invention, the effects of the invention can be obtained as far as the dyes each having the abovementioned skeletal structure are used in combination, but in order to realize the effects of the invention, it is preferred that the molecular weight of the dye having the pyrazolone methine skeleton is in the range of usually 600 or less, particularly 500 or less, more particularly 240 to 500, the molecular weight of the dye having the quinophthalone skeleton is in the range of usually 800 or less, particularly 600 or less, more particularly 350 to 600, and the molecular weight of the dye having the aminopyrazole azo skeleton is in the range of usually 600 or less, particularly 500 or less, more particularly 200 to 500 including the skeletal part and other partial structures. Each of the above ranges includes 250, 300, 350, 400, 450, 500, 550, 600, 650, 700, 750, and 800 as appropriate.

The specific examples of the dyes represented by the general formulae (I) to (III) are exemplified in the following Tables 1 to 7 but they are not limited thereto. These dyes can be produced according to the methods described in, for example, JP-A No. 3450/1990, JP-A No. 189289/1988, and JP-A No. 225592/1989, respectively, the entire contents of each of which are hereby incorporated by reference.

TABLE 1

Pyrazolone methine dyes represented by the general formula (I)

| Dye No. | Ring A | $R^1$ | $R^2$ | $R^3$ | $R^4$ |
|---|---|---|---|---|---|
| I-1 | 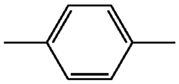 | $—C_2H_5$ | $—C_2H_5$ | $—OC_2H_5$ | 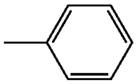 |
| I-2 | 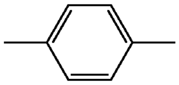 | $—C_2H_5$ | $—C_2H_5$ | $—N(CH_3)_2$ | 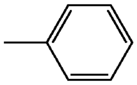 |
| I-3 | 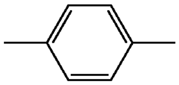 | $—C_2H_5$ | $—C_2H_5$ | $—CH_3$ | 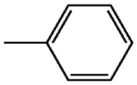 |
| I-4 |  | $-i-C_4H_9$ | $-i-C_4H_9$ | $—COOC_2H_5$ | 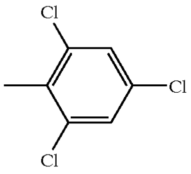 |
| I-5 | 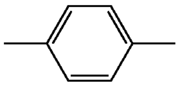 | $-i-C_4H_9$ | $-i-C_4H_9$ | $—OC_2H_5$ | 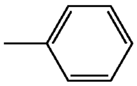 |
| I-6 | 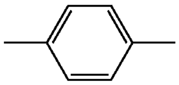 | $-i-C_4H_9$ | $-i-C_4H_9$ | $—N(CH_3)_2$ | 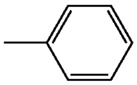 |
| I-7 | 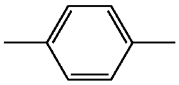 | $—C_2H_5$ | $—C_2H_4OC_2H_5$ | $—CH_3$ | $—CH_3$ |
| I-8 | 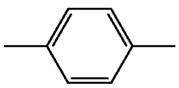 | $-n-C_3H_7$ | $-n-C_3H_7$ | $—CH_3$ | $-t-C_4H_9$ |
| I-9 | 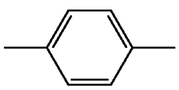 | $—CH_2CH{=}C_2H_5$ | $-n-C_4H_9$ | $—CH_3$ | 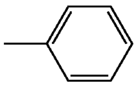 |
| I-10 | 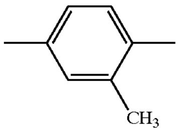 | $—C_2H_5$ | $-i-C_4H_9$ | $—C_2H_5$ | 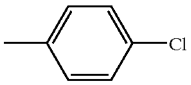 |

TABLE 2

| Dye No. | Ring A | $R^1$ | $R^2$ | $R^3$ | $R^4$ |
|---|---|---|---|---|---|
| I-11 | 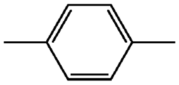 | $-i-C_3H_7$ | 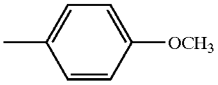 | $—CH_3$ | 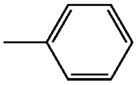 |
| I-12 | 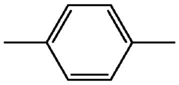 | $-n-C_8H_{17}$ | $—C_2H_5$ | —H | 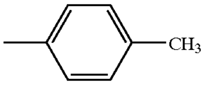 |
| I-13 | 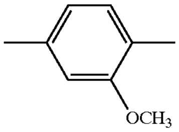 | $—C_2H_4Cl$ | $—C_2H_5$ | $—O-n-C_3H_7$ | 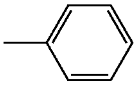 |
| I-14 | 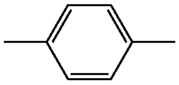 | $—C_2H_5$ | 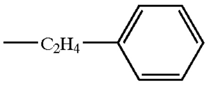 | $—CF_3$ | 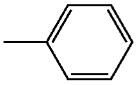 |
| I-15 | 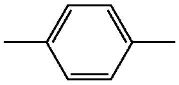 | $—C_2H_5$ | $-n-C_3H_6OCH_3$ | 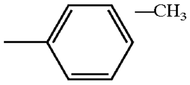 | $—CH_3$ |
| I-16 | 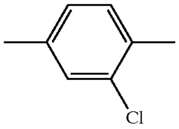 | $—C_2H_5$ | 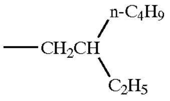 | $—OCH_3$ | 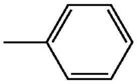 |
| I-17 |  | $—C_2H_5$ | $—C_2H_{OC2}H_4OC_2H_4$ | $-t-C_4H_9$ | 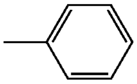 |
| I-18 | 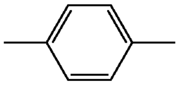 | $—C_2H_5$ | 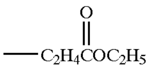 | $-n-C_3H_7$ | $-i-C_3H_7$ |
| I-19 |  | $—C_2H_5$ | $—C_2H_4CN$ | $—COO-i-C_4H_9$ | 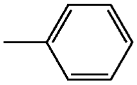 |
| I-20 | 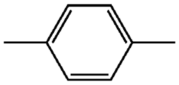 | $—C_2H_5$ | 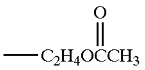 | $—CH_3$ | 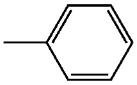 |
| I-21 | 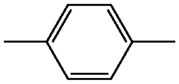 | $-n-C_6H_{13}$ | $-n-C_6H_{13}$ | $—CON(CH_3)_2$ | 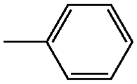 |

TABLE 3

| Quinophthalone dyes represented by the general formula (II) | | | |
|---|---|---|---|
| Dye No. | Ring B | X | Ring C |
| II-1 | 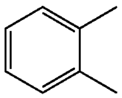 | —Br | 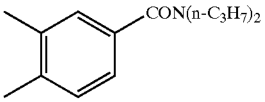 |

TABLE 3-continued

| Quinophthalone dyes represented by the general formula (II) | | | |
|---|---|---|---|
| Dye No. | Ring B | X | Ring C |
| II-2 | 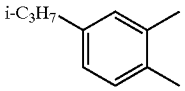 | —H | 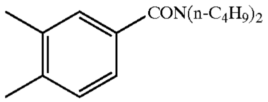 |

TABLE 3-continued
| Quinophthalone dyes represented by the general formula (II) | | | |
|---|---|---|---|
| Dye No. | Ring B | X | Ring C |
| II-3 | 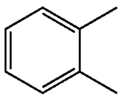 | —H | 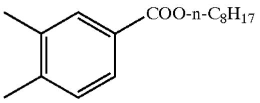 |
| II-4 | 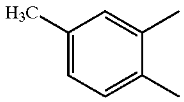 | —H | 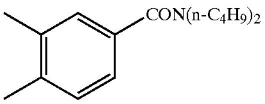 |
| II-5 | 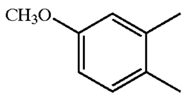 | —Br | 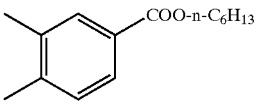 |
| II-6 | 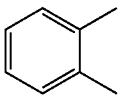 | —H | 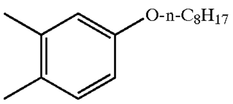 |
TABLE 3-continued
| Quinophthalone dyes represented by the general formula (II) | | | |
|---|---|---|---|
| Dye No. | Ring B | X | Ring C |
| II-7 | 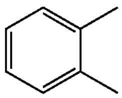 | —H | 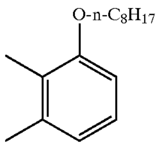 |
| II-8 | 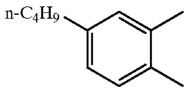 | —H | 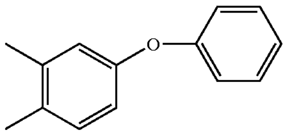 |
| II-9 | 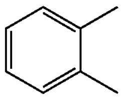 | —Br | 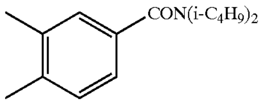 |
| II-10 | 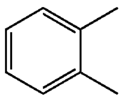 | —H | 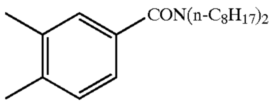 |
TABLE 4
| Dye No. | Ring B | X | Ring C |
|---|---|---|---|
| II-11 | 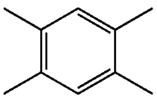 | —H | 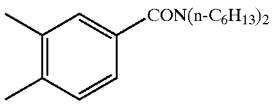 |
| II-12 | 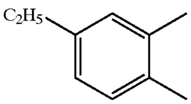 | —H | 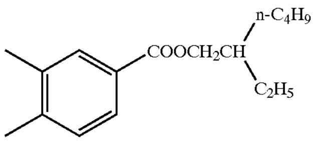 |
| II-13 | 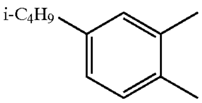 | —H | 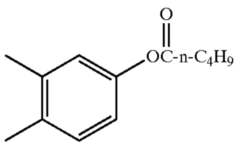 |
| II-14 | 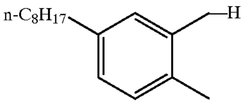 | —H | 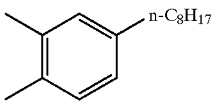 |

TABLE 4-continued
| Dye No. | Ring B | X | Ring C |
|---|---|---|---|
| II-15 | 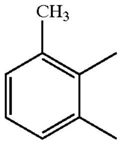 | —H | 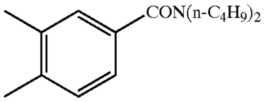 |
| II-16 | 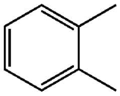 | —H | 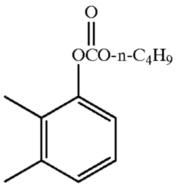 |
| II-17 | 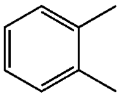 | —Br | 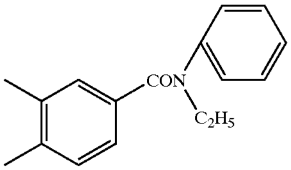 |
| II-18 | 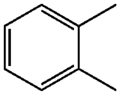 | —Br | 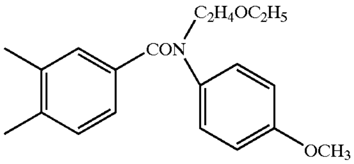 |
| II-19 | 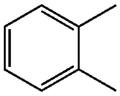 | —Br | 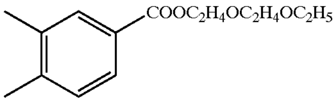 |
| II-20 | 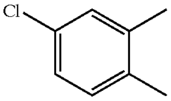 | —H | 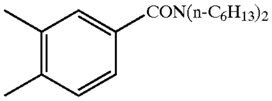 |
| II-21 | 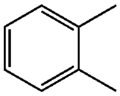 | —Cl | 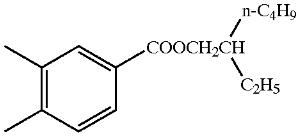 |
TABLE 5
| Dye No. | Ring B | X | Ring C |
|---|---|---|---|
| II-22 | 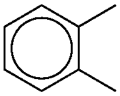 | H | 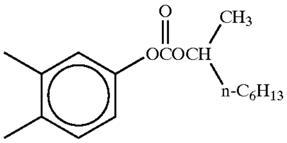 |
TABLE 5-continued
| Dye No. | Ring B | X | Ring C |
|---|---|---|---|
| II-23 | 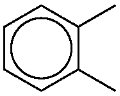 | H | 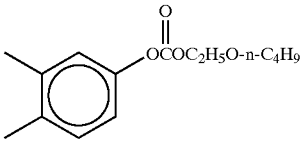 |

TABLE 5-continued
| Dye No. | Ring B | X | Ring C |
|---|---|---|---|
| II-24 | 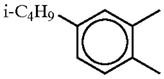 | H | 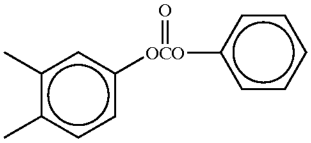 |
| II-25 | 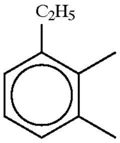 | Br | 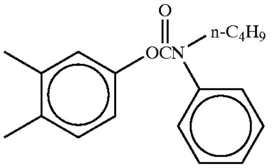 |
| II-26 | 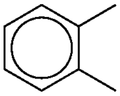 | H | 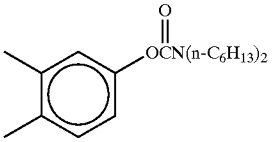 |
| II-27 | 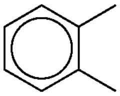 | H | 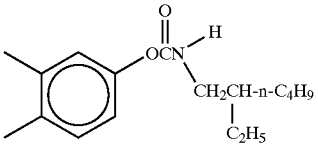 |
| II-28 | 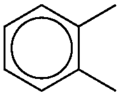 | H | 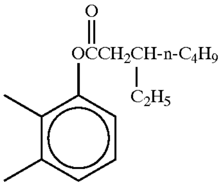 |
TABLE 5-continued
| Dye No. | Ring B | X | Ring C |
|---|---|---|---|
| II-29 | 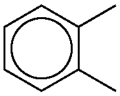 | H | 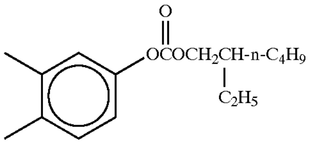 |
| II-30 | 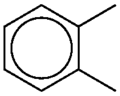 | H | 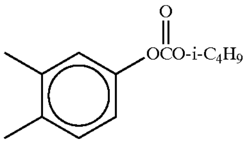 |
| II-31 | 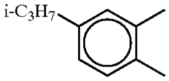 | H | 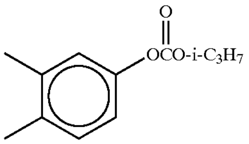 |
| II-32 | 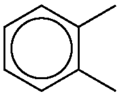 | Br | 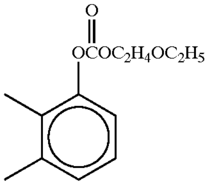 |
TABLE 6
Aminopyrazole azo dyes represented by the general formula (III)
| Dye No. | Ring D | $R^5$ | $R^6$ | $R^7$ | $R^8$ |
|---|---|---|---|---|---|
| III-1 | 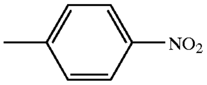 | $—CH_3$ | 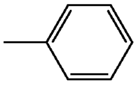 | —H | —H |
| III-2 | 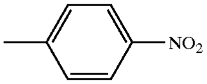 | $-t-C_4H_9$ | 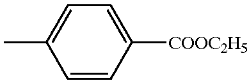 | —H | —H |
| III-3 | 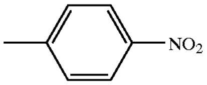 | $-t-C_4H_9$ | 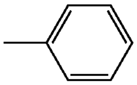 | —H | —H |
| III-4 | 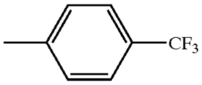 | $—CH_3$ | 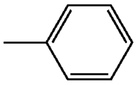 | —H | —H |
| III-5 | 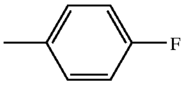 | $—CH_3$ | 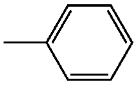 | —H | —H |

TABLE 6-continued
Aminopyrazole azo dyes represented by the general formula (III)
| Dye No. | Ring D | $R^5$ | $R^6$ | $R^7$ | $R^8$ |
|---|---|---|---|---|---|
| III-6 | 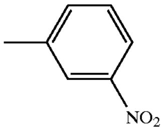 | $—CH_3$ | 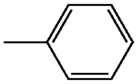 | —H | —H |
| III-7 | 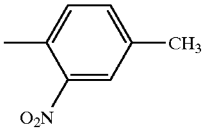 | $—CH_3$ | 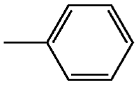 | —H | —H |
| III-8 | 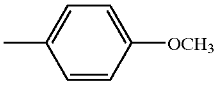 | $—C_2H_5$ | 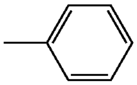 | —H | —H |
| III-9 | 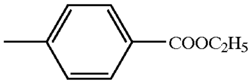 | $—C_2H_5$ | 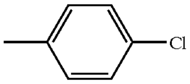 | —H | H |
| III-10 | 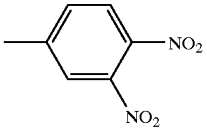 | $-n-C_4H_9$ | 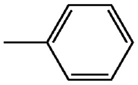 | —H | $—CH_3$ |
TABLE 7
| Dye No. | Ring D | $R^5$ | $R^6$ | $R^7$ | $R^8$ |
|---|---|---|---|---|---|
| III-11 | 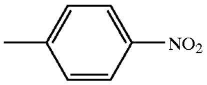 | $—OCH_3$ | 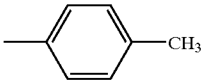 | —H | —H |
| III-22 | 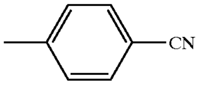 | $—OC_2H_5$ | 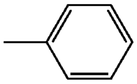 | —H | —H |
| III-13 | 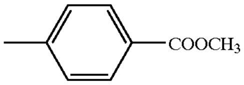 | 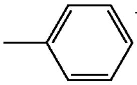 | $-i-C_4H_9$ | —H | —H |
| III-14 | 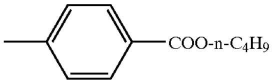 | $—COOC_2H_5$ | 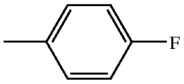 | —H | —H |
| III-15 | 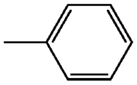 | $—CONHCH_3$ | 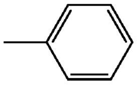 | —H | —H |
| III-16 | 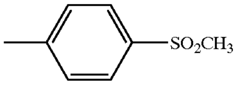 | $-t-C_4H_9$ | $—CH_3$ | —H | —H |
| III-17 | 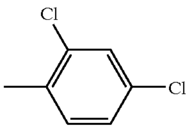 | $-i-C_3H_7$ | 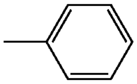 | —H | —H |

TABLE 7-continued

| Dye No. | Ring D | $R^5$ | $R^6$ | $R^7$ | $R^8$ |
|---|---|---|---|---|---|
| III-18 | 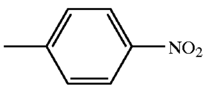 | $-t-C_4H_9$ | 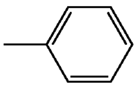 | $-CH_3$ | $-CH_3$ |
| III-19 | 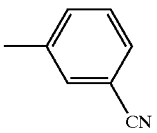 | $-n-C_3H_7$ | 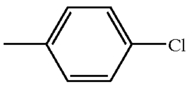 | —H | —H |
| III-20 | 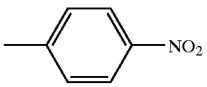 | $-COOCH_3$ | 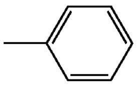 | —H | —H |
| III-21 | 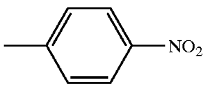 | $-n-C_8H_{17}$ | 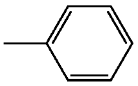 | —H | —H |

In the ink for thermal transfer and the sheet for thermal transfer of the invention, the ratio of the dye having the pyrazolone methine skeleton to the dye having the quinophthalone skeleton and/or the dye having the aminopyrazole azo skeleton is preferably as follows: the dye having the pyrazolone methine skeleton: the dye having the quinophthalone skeleton and/or the dye having the aminopyrazole azo skeleton (total amount in the case that the dye having the quinophthalone skeleton and the dye having the aminopyrazole azo skeleton are used in combination)=1:9 to 9:1 (weight ratio), particularly 2:8 to 8:2, more particularly 3:7 to 7:3, each of which includes 1, 2, 3, 4, 5, 6, 7, 8 and 9 as appropriate. The use of a smaller or larger amount of the dye having the pyrazolone methine skeleton exceeding the above range results in insufficient realization of the effects of the invention which may be obtained by the use of the dye having the pyrazolone methine skeleton in combination with the dye having the quinophthalone skeleton and/or the dye having the aminopyrazole azo skeleton. Preferably, in the case that the dye having the quinophthalone skeleton and the dye having the aminopyrazole azo skeleton are used in combination, the ratio is preferably as follows: the dye having the quinophthalone skeleton: the dye having the aminopyrazole azo skeleton=10:1 to 1:10 (weight ratio), each of which includes 2, 3, 4, 5, 6, 7, 8 and 9 as appropriate.

In order to satisfy the required standards for SWOP (Specification Web Offset Publications, the entire contents of which are hereby incorporated by reference) color, it is suitable to select the ratio optionally within the above range but it is preferred to select the ratio within the following range: the dye having the pyrazolone methine skeleton: the dye having the quinophthalone skeleton and/or the dye having the aminopyrazole azo skeleton=3:7 to 5:5 (weight ratio), each of which includes 3.5, 4, 4.5, 5.5, 6 and 6.5 as appropriate.

The ink for thermal transfer of the invention is an ink obtainable by dissolving or dispersing a dye having a pyrazolone methine skeleton and a dye having a quinophthalone skeleton and/or a dye having an aminopyrazole azo skeleton in a medium.

Examples of the medium include water, alcohols such as methyl alcohol, ethyl alcohol, isopropyl alcohol, and isobutyl alcohol, cellosolves such as methyl cellosolve and ethyl cellosolve, aromatics such as toluene, xylene, and chlorobenzene, esters such as ethyl acetate and butyl acetate, ketones such as acetone, methyl ethyl ketone, methyl isobutyl ketone, and cyclohexanone, chlorinated solvents such as methylene chloride, chloroform, and trichloroethylene, ethers such as tetrahydrofuran and dioxane, and other organic solvents such as N,Ndimethylformamide and N-methylpyrrolidone. These solvents may be used solely or as a mixture of two or more of them.

In the ink of the invention, in addition to the above dyes and medium, additives such as organic or inorganic non-sublimating fine particles, a dispersant, an antistatic agent, a antifoaming agent, antioxidant, a viscosity-regulating agent, and the like may be added, if necessary.

A yellow dye having other structure other than the dye having the pyrazolone methine skeleton and the dye having the quinophthalone skeleton and/or the dye having the aminopyrazole azo skeleton may be used in combination within the range where the effects of the invention are not inhibited.

In the ink for thermal transfer of the invention, the total concentration of the dyes in 100 parts by weight of the ink is preferably from 0.5 to 20 parts by weight, particularly 1 to 15 parts by weight, more particularly 4 to 15 parts by weight, which includes 0.6, 0.7, 0.8, 0.9, 2, 3, 5, 6, 7, 8, 9, 10, 12, 14, 16, 18 and 19 parts by weight. Moreover, the ratio of the above additives other than the dyes is 5 parts by weight or less, particularly 3 parts by weight or less in 100 parts by weight of the ink, and the lower limit of these additives in the case that they are added is preferably 0.01 part by weight or more, particularly 0.5 part by weight or more.

The sheet for thermal transfer of the invention has, on a substrate, a color material layer containing a dye having a pyrazolone methine skeleton and a dye having a quinophthalone skeleton and/or a dye having an aminopyrazole azo skeleton. In this connection, the color material layer may contain a yellow dye having other structure in addition to the dye having the pyrazolone methine skeleton, the dye having the quinophthalone skeleton, and the dye having the aminopyrazole azo skeleton within the range where the effects of the invention are not inhibited.

The method for forming the color material layer on a substrate is not particularly limited but usually, use is made of a method of preparing an ink by dissolving the dyes or dispersing them into a fine particle form in the above medium together with a binder, applying the ink onto a substrate, and drying it.

Examples of the binder for use herein include water-soluble resins such as cellulose types, acrylic acid types, starch types, and epoxy types and resins soluble in an organic solvent such as acrylic resins, methacrylic resins, polystyrene, polycarbonate, polyether sulfones, polyvinylbutyral, ethyl cellulose, acetyl cellulose, polyesters, AS resins, and phenoxy resins. Usually, the ratio of the binder to the dyes in the thermal transfer ink for color material layer formation is suitably as follows: the binder: the dyes=1:2 to 2:1 (weight ratio). Also, the binders may be used solely or as a mixture of two or more of them.

The base film to be used as a substrate for applying an ink for transfer sheet preparation is suitably a thin paper such as condenser paper or glassine paper, or a plastic film having a good heat resistance, such as a polyester, a polycarbonate, a polyamide, a polyimide, or a polyaramide, and the thickness is suitably in the rage of usually 3 to 50 μm, which includes 3.2, 3.5, 4, 4.5, 4.7, 5, 6, 7, 8, 9, 10, 20, 30, 40, 45, 47 and 49 μm.

Among the above base films, a polyethylene terephthalate film is particularly advantageous in view of mechanical strength, solvent resistance, economical efficiency, and the like. However, in some cases, the polyethylene terephthalate film exhibits not necessarily a sufficient heat resistance and the running property on a thermal head tends to be insufficient. Thus, the running property on a thermal head can be improved by providing a heat-resistant resin layer containing a lubricant, highly lubricant heat resistant fine particles, a surfactant, and a binder on the side opposite to the surface on which the color material layer is formed. In this case, examples of the lubricant include modified silicone compounds such as amino-modified silicone compounds and carboxy-modified silicone compounds, examples of the heat resistant fine particles include fine particles such as silica, and examples of the binder include acrylic resins or the like. The thickness of the heat-resistant resin layer is suitably in the range of usually 0.1 to 50 μm, which includes 0.2, 0.3, 0.4, 0.5, 0.6, 0.7, 0.8, 0.9, 1, 2, 3, 4, 5, 6, 7, 8, 9, 10, 20, 30, 40, 45, 47 and 49 μm.

The application of the ink onto the base film can be carried out by means of a gravure coater, reverse roll coater, rod coater, air doctor coater, or the like, and the ink is preferably applied so that the thickness of the color material layer after drying is in the range of 0.1 to 5 μm, which includes 0.2, 0.3, 0.4, 0.5, 0.6, 0.7, 0.8, 0.9, 1, 2, 3, 4, 4.5, 4.7, and 4.9 μm.

As a heating means for the sheet for thermal transfer of the invention, not only a thermal head but also an infrared ray, a laser beam, or the like may be also utilized. Moreover, using a current-conducting heat generation film which generates a heat when an electric current is supplied to the base film itself, the sheet can be used as a current-conducting type dye-transfer sheet.

In thermal transfer recording, color printing is carried out by repeating thermal recording operations on transfer sheets of three colors of yellow, magenta, and cyan or of four colors of the three colors and black. The hue of the resulting image is represented by an L* value, an a* value, and a b* value in CIELAB space and the hue can be compared by the a* value and the b* value in the image having a similar color density and L*⁻ value.

According to the invention, for the color reproduction of color images, a preferable hue as yellow color, i.e., the hue having an a* value, at a color density of 1.0 in the case of setting at 2° sight angle using D50 light source, of −13 to 10, particularly −13 to 5 and an b* value of 60 or more, particularly 70 or more can be achieved. A color standard SWOP (Specifications Web Offset Publications) of color proof ink for use in printing industry is also included in this range.

Furthermore, by using at least a magenta color material layer containing one or more magenta dyes represented by the following general formulae (IV) to (IX) and a cyan color material layer containing one or more cyan dyes represented by the following general formulae (X) to (XIV) in combination with the above thermal transfer recording sheet, clear yellow and black recorded products having a high density can be obtained with a low energy, and a sheet set for thermal transfer resulting in a recorded product having a good light resistance can be obtained.

In the dyes represented by the following general formula (IV) to (IX) to be contained in the magenta color material layer (in the following general formula (IV) to (IX), ① to ④ represent the positions for substitution), rings E-1 to E-3 each independently represents benzene ring which may have any substituent(s), ring F represents benzene ring or pyridine ring which may have substituent(s), $R^{11B}$ to $R^{11F}$ and $R^{12B}$ to $R^{12F}$ each independently represents hydrogen atom, an alkyl group which may be substituted, allyl group, an aryl group which may be substituted, or a cycloalkyl group which may be substituted, $R^{14B}$ represents an alkyl group which may be substituted or an aryl group which may be substituted, $R^{16A}$ and $R^{16B}$ each independently represents hydrogen atom, an alkyl group which may be substituted, or an aryl group which may be substituted, $R^{17}$ represents hydrogen atom, an alkyl group which may be substituted, allyl group, or an aryl group which may be substituted, $R^{18}$ and $R^{19}$ each independently represents amino group or hydroxy group, $R^{20}$ and $R^{21}$ each independently represents hydrogen atom or an aryloxy group which may be substituted, $R^{22}$ and $R^{23}$ each independently represents cyano group, nitro group, an alkyl group which may be substituted, a halogen atom, or hydrogen atom, $R^{24}$ represents hydrogen atom, nitro group, or an alkyl group which may be substituted $R^{25A}$ represents hydrogen atom or an alkyl group which may be substituted, $R^{26}$ represents an alkyl group which may be substituted, a cycloalkyl group which may be substituted, or an $NR^{27}R^{28}$ group in which $R^{27}$ and $R^{28}$ each independently represents an alkylcarbonyl group which may be substituted or an arylcarbonyl group which may be substituted, $X^A$ represents an $SR^{14C}$ group, an $S(O)R^{14D}$ group, or an $SO_2R^{14E}$ group in which $R^{14C}$ to $R^{14E}$ each independently represents an alkyl group which may be substituted or an aryl group which may be substituted, and Y represents a CH group or N.

(IV)

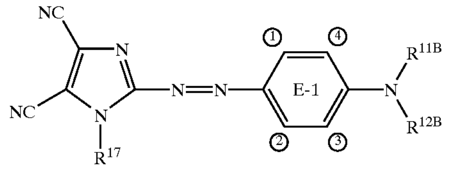

(V)

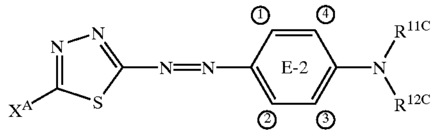

(VI)

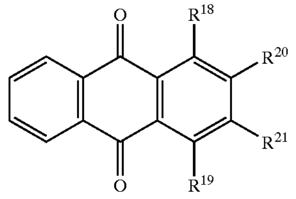

(VII)

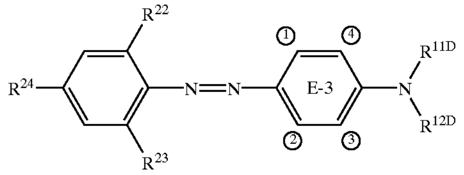

(VIII)

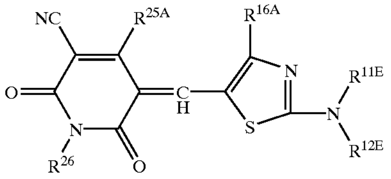

(IX)

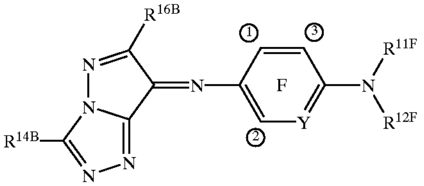

Preferably, rings E-1 to E-3 each is benzene ring which may be substituted by substituent(s) selected from the group including an alkyl group having 1 to 10 carbon atoms which may be substituted, an alkoxy group having 1 to 10 carbon atoms which may be substituted, a halogen atom, an $NHCOR^{14F}$ group, and an $NHSO_2R^{14G}$ group, ring F is benzene ring or pyridine ring which may be substituted by substituent(s) selected from the group including an alkyl group having 1 to 10 carbon atoms which may be substituted, an alkoxy group having 1 to 10 carbon atoms which may be substituted, a halogen atom, an $NHCOR^{14H}$ group, and an $NHSO_2R^{14I}$ group, in which $R^{14F}$ to $R^{14I}$ each independently represents an alkyl group having 1 to 12 carbon atoms which may be substituted or an aryl group having 6 to 10 carbon atoms which may be substituted, $R^{11B}$ to $R^{11F}$ and $R^{12B}$ to $R^{12F}$ each independently is an alkyl group having 1 to 12 carbon atoms which may be substituted, allyl group, an aryl group having 5 to 10 carbon atoms which may be substituted, or a cycloalkyl group having 5 to 7 carbon atoms which may be substituted, $R^{14B}$ is an alkyl group having 1 to 12 carbon atoms which may be substituted or an aryl group having 6 to 10 carbon atoms which may be substituted, $R^{16A}$ and $R^{16B}$ each independently is hydrogen atom, an alkyl group having 1 to 10 carbon atoms which may be substituted, or an aryl group having 5 to 19 carbon atoms which may be substituted, $R^{17}$ is hydrogen atom, an alkyl group having 1 to 10 carbon atoms which may be substituted, allyl group, or an aryl group having 5 to 19 carbon atoms which may be substituted, $R^{18}$ and $R^{19}$ each independently is amino group or hydroxy group, $R^{20}$ and $R^{21}$ each independently is hydrogen atom or an aryloxy group having 5 to 10 carbon atoms which may be substituted, $R^{22}$ and $R^{23}$ each independently is cyano group, nitro group, an alkyl group having 1 to 4 carbon atoms which may be substituted, a halogen atom, or hydrogen atom, $R^{24}$ is hydrogen atom, halogen atom, nitro group, or an alkyl group having 1 to 8 carbon atoms which may be substituted $R^{25A}$ is hydrogen atom or an alkyl group having 1 to 10 carbon atoms which may be substituted, $R^{26}$ is an alkyl group having 1 to 10 carbon atoms which may be substituted, a cycloalkyl group having 5 to 10 carbon atoms which may be substituted, or an $NR^{27}R^{28}$ group in which $R^{27}$ and $R^{28}$ each independently represents an alkylcarbonyl group having 2 to 9 carbon atoms which may be substituted or an arylcarbonyl group having 6 to 10 carbon atoms which may be substituted, $X^A$ is an $SR^{14C}$ group, an $S(O)R^{14D}$ group, or an $SO_2R^{14E}$ group having 1 to 8 carbon atoms, in which $R^{14C}$ to $R^{14E}$ each independently represents an alkyl group having 1 to 12 carbon atoms which may be substituted or an aryl group having 6 to 10 carbon atoms which may be substituted, and Y is a CH group or N.

Particularly preferably, rings E-1 to E-3 each is benzene ring which may be substituted by substituent(s) selected from the group including a linear or branched alkyl group having 1 to 4 carbon atoms which may be substituted, a linear or branched alkoxy group having 1 to 4 carbon atoms which may be substituted, a halogen atom, an $NHCOR^{14F}$ group having 2 to 5 carbon atoms, and an $NHSO_2R^{14G}$ group having 1 to 4 carbon atoms, in which $R^{14F}$ and $R^{14I}$ each is preferably unsubstituted phenyl group or phenyl group having methyl group, ethyl group, methoxy group, ethoxy group, chlorine group, fluorine group, or trifluoromethyl group as substituent(s), or an alkyl group having 1 to 8 carbon atoms which may be substituted, and ring F is benzene ring or pyridine ring which may be substituted by a linear or branched alkyl group having 1 to 4 carbon atoms.

In this connection, in the case that rings E-1 to E-3 are substituted, the position for substitution may be any of 1-position to 4-position (the positions of ① to ④), and is preferably 2-position or 4-position (the position of ① or ④).

Moreover, in the case that ring F is substituted, the position for substitution may be any of 1-position to 3-position (the positions of ① to ③), and is preferably 2-position (the position of ②).

Furthermore, $R^{11B}$ to $R^{11F}$ and $R^{12B}$ to $R^{12F}$ each independently is preferably a linear or branched alkyl group having 1 to 10 carbon atoms which may be substituted; an alkoxyalkyl group having 3 to 8 carbon atoms which may be substituted, or an aryloxyalkyl group having 8 to 14 carbon atoms which may be substituted, $R^{14B}$ is preferably phenyl group which may have methyl group, ethyl group, methoxy group, ethoxy group, chlorine group, fluorine group, and/or trifluoromethyl group, or an alkyl group having 1 to 8 carbon atoms which may be substituted, $R^{16A}$ and $R^{16B}$ each independently is preferably hydrogen atom or an alkyl group having 1 to 4 carbon atoms which may be substituted, $R^{17}$ is preferably a linear or branched alkyl group having 1 to 8 carbon atoms which may be substituted or allyl group, $R^{18}$ and $R^{19}$ each independently is preferably amino group or hydroxy group, $R^{20}$ and $R^{21}$ each independently is preferably hydrogen atom or phenoxy group, $R^{22}$ and $R^{23}$ each independently is preferably hydrogen atom, cyano group, nitro group, or methyl group, $R^{24}$ is preferably hydrogen atom, a halogen atom, or methyl group, $R^{25A}$ is preferably a linear or branched alkyl group having 1 to 4 carbon atoms, hydrogen atom, or trifluoromethyl group, and $R^{26}$ is preferably a linear or branched alkyl group having 1 to 8 carbon atoms which may be substituted or an $NR^{27}R^{28}$ group having 4 to 14 carbon atoms in which $R^{27}$ and $R^{28}$ each independently is preferably an alkylcarbonyl group having 2 to 9 carbon atoms or phenylcarbonyl group having 7 to 10 carbon atoms which may have substituent(s).

Moreover, $X^{A}$ is preferably an $S(O)_2R^{14E}$ group having 1 to 8 carbon atoms, in which $R^{14D}$ is preferably phenyl group which may be substituted by methyl group, ethyl group, methoxy group, ethoxy group, chlorine group, fluorine group, or trifluoromethyl group, or an alkyl group having 1 to 8 carbon atoms which may be substituted, and Y is preferably a CH group or N.

With regard to the dyes represented by the general formulae (IV) to (IX), one kind of them may be contained in the color material layer of magenta solely or two or more kinds of the dyes represented by the same general formula or different general formulae may be contained as a mixture.

In the dyes represented by the following general formula (X) to (XIV) to be contained in the color material layer of cyan (in the following general formula (X) to (XIV), ① to ⑤ represent the positions for substitution), rings E-4 to E-6 and ring G-1 each independently represents benzene ring which may have substituent(s), $R^{11G}$ to $R^{11J}$ and $R^{12G}$ to $R^{12J}$ each independently represents hydrogen atom, an alkyl group which may be substituted, allyl group, an aryl group which may be substituted, or a cycloalkyl group which may be substituted, $R^{15C}$, $R^{16C}$, and $R^{16D}$ each independently represents hydrogen atom, an alkyl group which may be substituted, or an aryl group which may be substituted, $R^{25B}$ to $R^{25D}$ each independently represents hydrogen atom or an alkyl group which may be substituted, $R^{29}$ represents an alkyl group which may be substituted, an alkoxy group which may be substituted, an aryl group which may be substituted, or an aryloxy group which may be substituted, $R^{30}$ represents an alkyl group which may be substituted, an aryl group which may be substituted, or hydroxy group, $R^{31}$ represents cyano group, a $COOR^{15G}$ group, or a $CONR^{15H}R^{16H}$ group, in which $R^{15G}$, $R^{15H}$, and $R^{16H}$ each independently represents hydrogen atom, an alkyl group which may be substituted, or an aryl group which may be substituted, and Z represents hydrogen atom or a halogen atom (X)

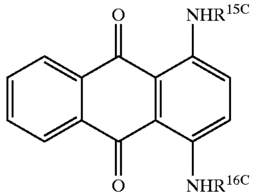

(XI)

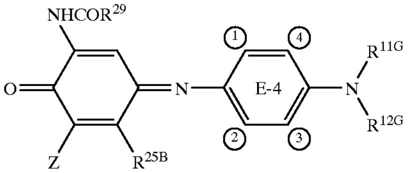

(XII)

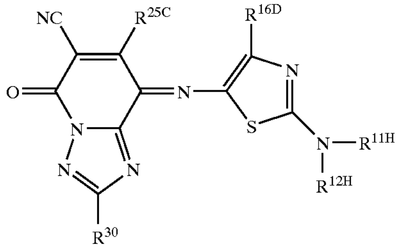

(XIII)

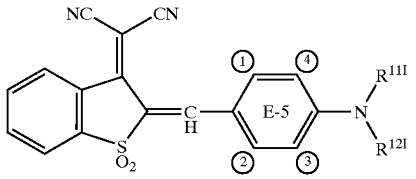

(XIV)

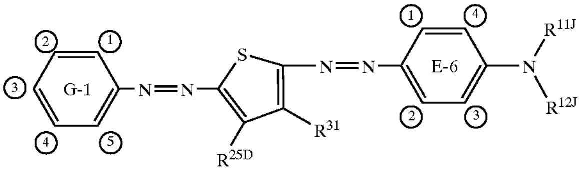

Preferably, rings E-4 to E-6 each independently is benzene ring which may be substituted by substituent(s) selected from the group including an alkyl group having 1 to 10 carbon atoms which may be substituted, an alkoxy group having 1 to 10 carbon atoms which may be substituted, a halogen atom, an $NHCOR^{14F}$ group and an $NHSO_2R^{14G}$ group, in which $R^{14F}$ and $R^{14G}$ each independently represents an alkyl group having 1 to 12 carbon atoms which may be substituted or an aryl group having 6 to 10 carbon atoms which may be substituted, ring G-1 is benzene ring which may be substituted by substituent(s) selected from the group including an alkyl group having 1 to 10 carbon atoms which may be substituted, an alkoxy group having 1 to 10 carbon atoms which may be substituted, a halogen atom, cyano group, nitro group, or a $COOR^{15B}$ group having 2 to 11 carbon atoms in which $R^{15B}$ represents hydrogen atom, an alkyl group having 1 to 10 carbon atoms which may be substituted or an aryl group having 5 to 19 carbon atoms which may be substituted, $R^{11G}$ to $R^{11J}$ and $R^{12G}$ to $R^{12J}$ each independently is an alkyl group having 1 to 12 carbon atoms which may be substituted, allyl group, an aryl group having 5 to 10 carbon atoms which may be substituted, or a cycloalkyl group having 5 to 7 carbon atoms which may be substituted, $R^{15C}$, $R^{16C}$, and $R^{16D}$ each independently is hydrogen atom, an alkyl group having 1 to 10 carbon atoms which may be substituted, or an aryl group having 5 to 19 carbon atoms which may be substituted, $R^{21B}$ to $R^{25D}$ each independently is hydrogen atom or an alkyl group having 1 to 10 carbon atoms which may be substituted, $R^{29}$ is an alkyl group having 1 to 10 carbon atoms which may be substituted, an alkoxy group having 1 to 10 carbon atoms which may be substituted, an aryl group having 5 to 10 carbon atoms which may be substituted, or an aryloxy group having 5 to 10 carbon atoms which may be substituted, $R^{30}$ is an alkyl group having 1 to 10 carbon atoms which may be substituted, an aryl group having 5 to 10 carbon atoms which may be substituted, or hydroxy group, $R^{31}$ is cyano group, a $COOR^{15G}$ group having 1 to 9 carbon atoms, or a $CONR^{15H}R^{16H}$ group having 2 to 19 carbon atoms, in which $R^{15G}$, $R^{15H}$, and $R^{16H}$ each independently represents hydrogen atom, an alkyl group having 1 to 10 carbon atoms which may be substituted, or an aryl group having 5 to 19 carbon atoms which may be substituted, and Z is hydrogen atom or a halogen atom.

Particularly preferably, rings E-4 to E-6 each independently is benzene ring which may be substituted by substituent(s) selected from the group including a linear or branched alkyl group having 1 to 4 carbon atoms, a linear or branched alkoxy group having 1 to 4 carbon atoms, a halogen atom, an $NHCOR^{14F}$ group having 2 to 5 carbon atoms and an $NHSO_2R^{14G}$ group having 1 to 4 carbon atoms, and ring G-1 is benzene ring which may be substituted by substituent(s) selected from the group including a linear or branched alkyl group having 1 to 4 carbon atoms, a halogen atom, trifluoromethyl group, cyano group, nitro group, or an alkoxycarbonyl group having 2 to 13 carbon atoms.

In this connection, in the case that rings E-4 to E-6 are substituted, the position for substitution may be any of 1-position to 4-position (the positions of (① to ④), and is preferably 2-position or 4-position (the position of ② or ④).

Moreover, in the case that ring G-1 is substituted, the position for substitution may be any of 1position to 5-position (the positions of ① to ⑤), and is preferably 1-position or 3-position (the position of ① or ③).

Moreover, $R^{11G}$ to $R^{11J}$ and $R^{12G}$ to $R^{12J}$ each independently is preferably a linear or branched alkyl group having 1 to 10 carbon atoms which may be substituted, an alkoxyalkyl group having 3 to 8 carbon atoms which may be substituted, or an aryloxyalkyl group having 8 to 14 carbon atoms which may be substituted, $R^{15C}$, $R^{16C}$, and $R^{16D}$ each independently is preferably hydrogen atom or an alkyl group having 1 to 4 carbon atoms which may be substituted, $R^{25B}$ to $R^{25D}$ is preferably a linear or branched alkyl group having 1 to 4 carbon atoms, hydrogen atom, or trifluoromethyl group, $R^{29}$ is preferably a linear or branched alkyl group having 1 to 8 carbon atoms, a linear or branched alkoxy group having 1 to 8 carbon atoms, phenyl group which may be substituted, or phenyloxy group which may be substituted, $R^{30}$ is preferably a linear or branched alkyl group having 1 to 8 carbon atoms, $R^{31}$ is preferably cyano group or an alkoxycarbonyl group having 2 to 9 carbon atoms, and Z is preferably hydrogen atom, chlorine atom, or bromine atom.

With regard to the dyes represented by the general formulae (VIII) to (XII), one kind of them may be contained in the color material layer of cyan solely or two or more kinds of the dyes represented by the same general formula or different general formulae may be contained as a mixture.

The following shows specific examples of the magenta dyes represented by the above general formula (IV) to (IX) and the cyan dyes represented by the above general formula (X) to (XIV).

TABLE 8

Dye compounds represented by the general formula (IV)

| Dye No. | Ring E-1 | $R^{11B}$ | $R^{12B}$ | $R^{17}$ |
|---|---|---|---|---|
| IV-1 | 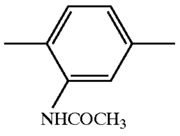 | $-n-C_4H_9$ | $-n-C_4H_9$ | $-n-C_4H_9$ |
| IV-2 | 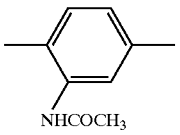 | $-n-C_3H_7$ | $-n-C_3H_7$ | $—CH_2CH{=}CH_2$ |

TABLE 8-continued
| Dye compounds represented by the general formula (IV) | | | | |
|---|---|---|---|---|
| Dye No. | Ring E-1 | $R^{11B}$ | $R^{12B}$ | $R^{17}$ |
| IV-3 |  | $—C_2H_5$ | $—C_2H_5$ | $-n-C_4H_9$ |
| IV-4 | 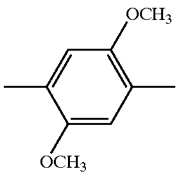 | $—C_2H_4OCH_3$ | $—C_2H_5$ | $-t-C_4H_9$ |
| IV-5 | 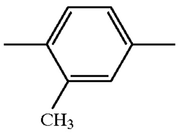 | $—C_2H_5$ | $—C_2H_4OCOCH_3$ | $—CH_2CN$ |
TABLE 9
| Dye compounds represented by the general formula (V) | | | | |
|---|---|---|---|---|
| Dye No. | Ring E-2 | $R^{11C}$ | $R^{12C}$ | $X^A$ |
| V-1 | 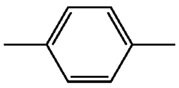 | $-i-C_4H_9$ | $-i-C_4H_9$ | $—SO_2-i-C_4H_9$ |
| V-2 | 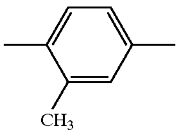 | $—C_2H_5$ | $—C_2H_5$ | $—S-n-C_4H_9$ |
| V-3 | 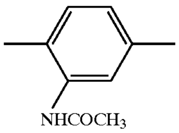 | $—C_2H_5$ | $-i-C_3H_7$ | $—SO—C_2H_5$ |
| V-4 | 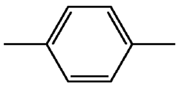 | $—C_2H_5$ | $—C_3H_6OCH_3$ | $—SO_2-n-C_6H_{13}$ |
| V-5 | 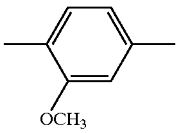 | $-n-C_8H_{17}$ | $—C_2H_5$ | $—SO_2—C_2H_4OCH_3$ |

TABLE 10

| Dye compounds represented by the general formula (VI) | | | | |
|---|---|---|---|---|
| Dye No. | $R^{18}$ | $R^{19}$ | $R^{20}$ | $R^{21}$ |
| VI-1 | $—NH_2$ | —OH | 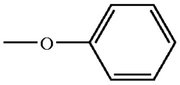 | —H |
| VI-2 | $—NH_2$ | $—NH_2$ | 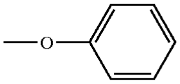 | 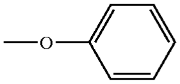 |
| VI-3 | $—NH_2$ | —OH | $—OCH_3$ | —H |
| VI-4 | $—NH_2$ | —OH | 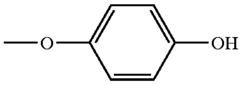 | —H |
| VI-5 | $—NH_2$ | —OH | 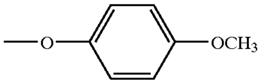 | —H |

TABLE 11

| Dye compounds represented by the general formula (VII) | | | | | | |
|---|---|---|---|---|---|---|
| Dye No. | Ring E-3 | $R^{11D}$ | $R^{12D}$ | $R^{22}$ | $R^{23}$ | $R^{24}$ |
| VII-1 | 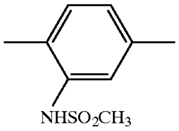 | $-n-C_3H_7$ | $-n-C_3H_7$ | —CN | —CN | $—CH_3$ |
| VII-2 | 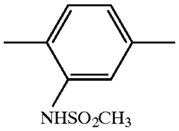 | $—C_2H_5$ | $—C_2H_5$ | —CN | —CN | $—CH_3$ |
| VII-3 | 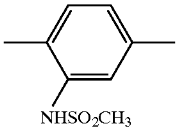 | $-i-C_4H_9$ | $-i-C_4H_9$ | —CN | —CN | $—CH_3$ |
| VII-4 | 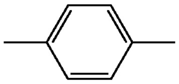 | $—C_2H_4CN$ | $—C_2H_4OCO-i-C_3H_7$ | —H | —CN | $—NO_2$ |
| VII-5 | 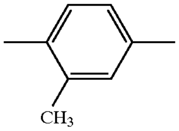 | $—C_2H_5$ | $—C_2H_4CN$ | —H | —Cl | $—NO_2$ |

TABLE 12

| Dye compounds represented by the general formula (VIII) | | | | | |
|---|---|---|---|---|---|
| Dye No. | $R^{11E}$ | $R^{12E}$ | $R^{16A}$ | $R^{25A}$ | $R^{26}$ |
| VIII-1 | $-n-C_4H_9$ | $-n-C_4H_9$ | 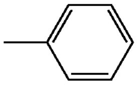 | $—CH_3$ | 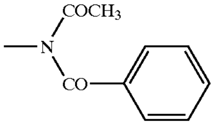 |
| VIII-2 | $-i-C_4H_9$ | $-i-C_4H_9$ | 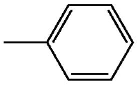 | $—CH_3$ | $-n-C_4H_9$ |
| VIII-3 | $—C_2H_4OC_2H_5$ | $—C_2H_4OC_2H_5$ | 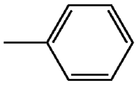 | $—CH_3$ | $—C_3H_6OCH_3$ |
| VIII-4 | $—C_2H_5$ | $—C_2H_4OCOCH_3$ | 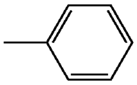 | $—CH_3$ | $-i-C_4H_9$ |
| VIII-5 | $—C_2H_5$ | 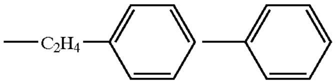 | | $—CH_3$ | $-n-C_8H_{17}$ |

TABLE 13

| Dye compounds represented by the general formula (IX) | | | | | |
|---|---|---|---|---|---|
| Dye No. | Ring F | $R^{11F}$ | $R^{12F}$ | $R^{14B}$ | $R^{16B}$ |
| IX-1 | 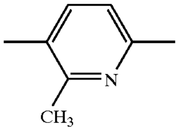 | $—C_2H_5$ | $—C_2H_5$ | 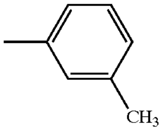 | $-t-C_4H_9$ |
| IX-2 | 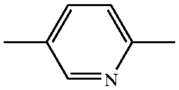 | $-n-C_4H_9$ | $-n-C_4H_9$ | $—CF_3$ | $-t-C_4H_9$ |
| IX-3 | 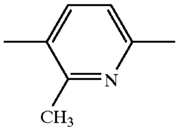 | $—C_2H_5$ | $—C_2H_4OCH_3$ | 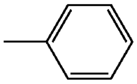 | $—CF_3$ |
| IX-4 | 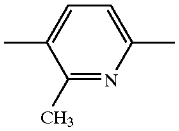 | $—C_2H_5$ | $—C_2H_4CN$ | $-i-C_3H_7$ | $—CH_3$ |
| IX-5 | 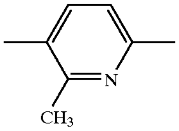 | $—C_2H_5$ | $—C_2H_4OCOCH_3$ | 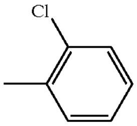 | $-n-C_4H_9$ |

TABLE 14

Dye compounds represented by the general formula (X)

| Dye No. | $R^{15c}$ | $R^{16C}$ |
|---|---|---|
| X-1 | $—CH_3$ | 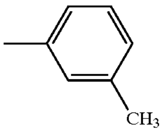 |
| X-2 | $—CH_3$ | $—CH_3$ |
| X-3 | $-i-C_3H_7$ | $-i-C_3H_7$ |

TABLE 14-continued

Dye compounds represented by the general formula (X)

| Dye No. | $R^{15c}$ | $R^{16C}$ |
|---|---|---|
| X-4 | $—CH_3$ | $—C_4H_4OH$ |
| X-5 | 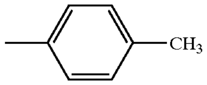 | 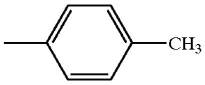 |

TABLE 15

Dye compounds represented by the general formula (XI)

| Dye No. | Ring E-4 | $R^{11G}$ | $R^{12G}$ | $R^{25B}$ | $R^{29}$ | Z |
|---|---|---|---|---|---|---|
| XI-1 | 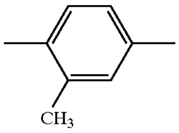 | $—C_2H_5$ | $—C_2H_5$ | $—CH_3$ | $—CH_3$ | —Cl |
| XI-2 | 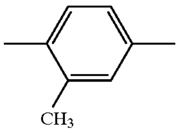 | $—C_2H_5$ | $—C_2H_5$ | $—CH_3$ | $—CH_3$ | —H |
| XI-3 | 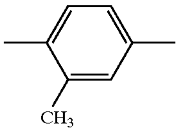 | $—C_2H_5$ | $—C_2H_5$ | $—CH_3$ | $—OC_2H_5$ | —Cl |
| XI-4 | 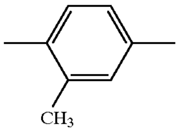 | $—C_2H_5$ | $—C_2H_5$ | $—CH_3$ | 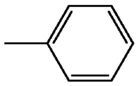 | —Cl |
| XI-5 | 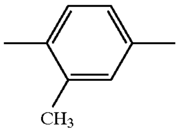 | $—C_2H_5$ | $—C_2H_5$ | —H | $—CH_3$ | —H |

TABLE 16

Dye compounds represented by the general formula (XII)

| Dye No. | $R^{11H}$ | $R^{12H}$ | $R^{16D}$ | $R^{25C}$ | $R^{30}$ |
|---|---|---|---|---|---|
| XII-1 | $-n-C_4H_9$ | $-n-C_4H_9$ | 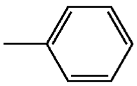 | $—CH_3$ | 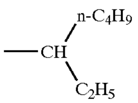 |

TABLE 16-continued

Dye compounds represented by the general formula (XII)

| Dye No. | $R^{11H}$ | $R^{12H}$ | $R^{16D}$ | $R^{25C}$ | $R^{30}$ |
|---|---|---|---|---|---|
| XII-2 | $-C_2H_5$ | $-C_2H_5$ | 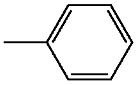 | $-CH_3$ | 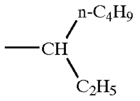 |
| XII-3 | $-C_2H_5$ | $-C_2H_5$ | 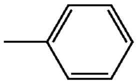 | $-CH_3$ | $-i-C_3H_7$ |
| XII-4 | $-n-C_4H_9$ | $-C_2H_4OC_2H_5$ | 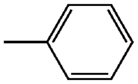 | $-CH_3$ | $-i-C_3H_7$ |
| XII-5 | $-i-C_4H_9$ | $-C_2H_5$ | 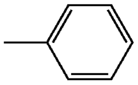 | $-CH_3$ | 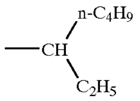 |

TABLE 17

Dye compounds represented by the general formula (XIII)

| Dye No. | Ring E-5 | $R^{11I}$ | $R^{12I}$ |
|---|---|---|---|
| XIII-1 | 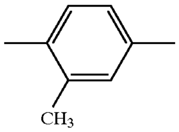 | $-n-C_6H_{13}$ | $-n-C_6H_{13}$ |
| XIII-2 | 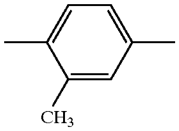 | $-C_2H_5$ | 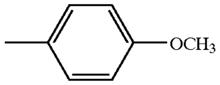 |
| XIII-3 | 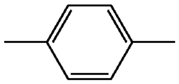 | $-C_2H_5$ | $-C_2H_4OC_2H_5$ |

TABLE 17-continued

Dye compounds represented by the general formula (XIII)

| Dye No. | Ring E-5 | $R^{11I}$ | $R^{12I}$ |
|---|---|---|---|
| XIII-4 | 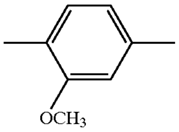 | $-i-C_4H_9$ | $-i-C_4H_9$ |
| XIII-5 | 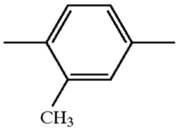 | $-n-C_4H_9$ | 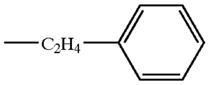 |

TABLE 18

Dye compounds represented by the general formula (XIV)

| Dye No. | Ring G-1 | $R^{25D}$ | $R^{31}$ | Ring E-6 | $R^{11J}$ | $R^{12J}$ |
|---|---|---|---|---|---|---|
| XIV-1 | 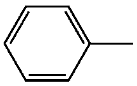 | —H | —CN | 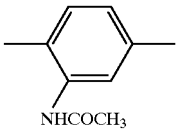 | $-C_2H_5$ | $-C_2H_5$ |

TABLE 18-continued

| Dye compounds represented by the general formula (XIV) | | | | | | |
|---|---|---|---|---|---|---|
| Dye No. | Ring G-1 | $R^{25D}$ | $R^{31}$ | Ring E-6 | $R^{11J}$ | $R^{12J}$ |
| XIV-2 | 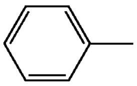 | —H | —CN | 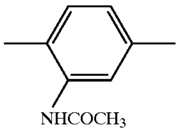 | $—C_2H_5$ | $—C_2H_4OC_2H_5$ |
| XIV-3 | 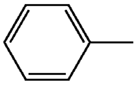 | —H | —CN | 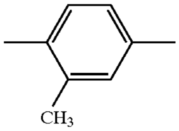 | $-i-C_4H_9$ | $-i-C_4H_9$ |
| XIV-4 | 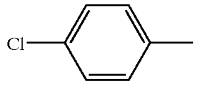 | $—CH_3$ | —CN | 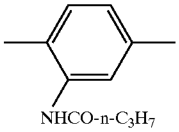 | $—C_2H_5$ | $—C_2H_4OCOCH_3$ |
| XIV-5 | 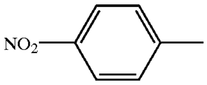 | —H | $—COOC_2H_5$ | 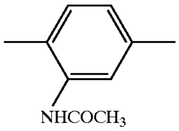 | $—C_2H_5$ | $—C_2H_4CN$ |

The color material layer of a sheet set for thermal transfer of the invention using each of these magenta and cyan dyes may be prepared in a similar manner on a substrate.

The sheet set for thermal transfer of the invention may be obtained by laminating the color material layers of at least three colors of yellow, magenta, and cyan successively on one support, or the sheets obtained by preparing each of the color material layers of yellow, magenta, and cyan on separate supports may be used in combination.

The ink for thermal transfer, the sheet for thermal transfer and the sheet set using the sheets for thermal transfer exhibit totally excellent performance such as a high recording density in thermal transfer recording, a clear color tone of recorded products, and a high stability of recorded products, and especially an excellent light resistance of recorded products, and also the dyes are easily produced, so that the ink, the sheet, and the sheet set can be industrially advantageously produced.

EXAMPLES

Having generally described this invention, a further understanding can be obtained by reference to certain specific examples, which are provided herein for purposes of illustration only and are not intended to be limiting unless otherwise specified.

Example 1

A mixture having the following composition was treated for 30 minutes by an ultrasonic cleaning machine to prepare an ink.

{Composition of the ink}

Dye No. I-1: 2.4 parts by weight

Dye No. 11-1: 3.6 parts by weight

Phenoxy resin ("PKHJ" manufactured by Union Carbide): 10 parts by weight

Tetrahydrofuran: 90 parts by weight

The resulting ink was applied onto a polyethylene terephthalate film (6 μm thickness) by means of a wire bar and dried (dried layer thickness: about 1 μm) to form a color material layer. Then, a liquid including 10 parts by weight of an acrylic resin (Trade name: BR-80, manufactured by Mitsubishi Rayon Co., Ltd.), 1 part by weight of an amino-modified silicone oil (Trade name: KF393, Shinetsu Chemical Co., Ltd.), and 89 parts by weight of toluene was applied onto the rear side of the polyethylene terephthalate film and dried (dried layer thickness: about 1 μm) to form a heat-resistant resin layer, whereby a sheet for thermal transfer was obtained.

The resulting sheet for thermal transfer was connected to an ink ribbon of VM-MPA50 of a printer "NV-MPX5" manufactured by Matsushita Electric Industrial Co. Ltd., and a gradation image was recorded on VM-MPA50 recording paper by the printer "NV-MPX5" manufactured by Matsushita Electric Industrial Co. Ltd. Thereby, a recorded product having the color density shown in Table 7 was obtained.

Moreover, the a* value and b* value in CIELAB space at a color density of 1.0 in the case of setting at 2° sight angle using D50 light source were measured. The results are shown in Table 7.

The color density, a* value and b* value are measured using a spectrophotometer (Trade name: SPM-50, manufactured by Gretag).

Furthermore, a light resistance test of the obtained recorded product (color density: about 1.0) was carried out (black panel temperature: 63±2° C.) for 80 hours using a xenon lamp fademeter (manufactured by Suga Shikenki K.K.), and light resistance was determined by measuring the CIELAB color difference (ΔE) of the recorded product before and after the test. The results are shown in Table 7.

Examples 2 to 4 and Comparative Examples 1 to 6

Preparation of an ink, preparation of a thermal transfer sheet, transfer recording, and evaluation were carried out in the same manner as in Example 1 with the exception that the dyes shown in Table 19 were used as dyes. The results are shown in Table 19.

Kagaku Kogyo K.K.): 10 parts by weight

Toluene: 70 parts by weight

Cyclohexanone: 10 parts by weight

TABLE 19

| | Dyes | | | | | | | | Evaluation results | | | |
|---|---|---|---|---|---|---|---|---|---|---|---|---|
| | Pyrazolone-methine | | Quinophthalone | | Amino-pyrazoleazo | | Other dyes | | Color density | | | |
| Example | Kind | Amount (part by weight) | Kind | Amount (part by weight) | Kind | Amount (part by weight) | Kind | Amount (part by weight) | (Maximum printing density) | a* value | b* value | Light resistance (delta E) |
| Example 1 | I-1 | 2.4 | II-1 | 3.6 | | | | | 2.0 | 2.8 | 78.0 | 2 |
| Example 2 | I-1 | 2.4 | | | III-1 | 3.6 | | | 2.3 | 3.1 | 77.0 | 6 |
| Compara. Ex. 1 | I-1 | 6 | | | | | | | 2.2 | 11.1 | 84.8 | 3 |
| Compara. Ex. 2 | | | II-1*[2] | 6 | | | | | 1.4 | −9.8 | 64.0 | 1 |
| Compara. Ex. 3 | | | | | III-1*[3] | 6 | | | 1.6 | 1.9 | 76.9 | 4 |
| Example 3 | I-2 | 2.4 | II-1 | 3.6 | | | | | 2.2 | 2.5 | 74.0 | 3 |
| Compara. Ex. 4 | I-2*[1] | 6 | | | | | | | 2.2 | 10.9 | 87.9 | 3 |
| Compara. Ex. 5 | I-2 | 2.4 | | | | | Dye A*[4] | 3.6 | 2.0 | ±0.0 | 74.3 | 20 |
| Compara. Ex. 6 | I-2 | 2.4 | | | | | Dye B*[5] | 3.6 | 2.2 | 1.3 | 71.6 | 14 |
| Example 4 | I-2 | 2.4 | II-2 | 3.6 | | | | | 2.4 | 2.9 | 76.2 | 6 |

*[1]Dye I-2 corresponds Dye No. 1 described in JP-A No. 3450/1990.
*[2]Dye II-1 corresponds Dye No. 2-3 described in JP-A No. 189289/1988.
*[3]Dye III-1 corresponds Dye No. 1 described in JP-A No. 225592/1989.
*[4]Dye A

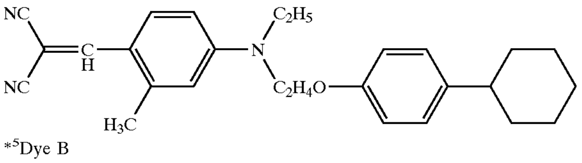

*[5]Dye B

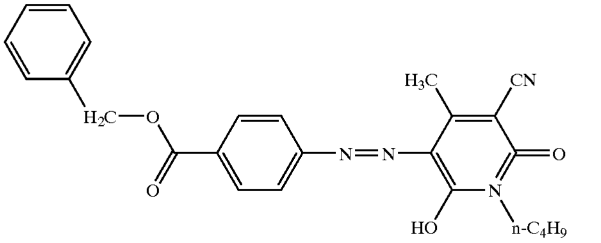

From the above results, it is evident that, in the case that each dye to be used in the present application is used solely, the balance of performance such as the color density, a* value, b* value and light resistance is yet insufficient but an ink having an excellent balance of performance is obtained by using the dyes in combination as in the invention.

In addition, it is also evident that the combination according to the invention has more excellent balance of performance than the combination with Dye A or Dye B described in known literatures has.

Example 5

Using an ink prepared by the following method instead of the ink used in Example 1, preparation of a thermal transfer sheet, transfer recording, and evaluation were carried out in the same manner as in Example 1. As a result, a uniform color density could be obtained and it was confirmed that the resulting recorded product had a good light resistance.

{Composition of the ink}

Dye No. 1-1: 2.4 parts by weight

Dye No. 11-1: 3.6 parts by weight

AS resin (Product name: Denka AS-S, manufactured by Denki

Example 6

Each mixture having the following composition was treated for 30 minutes by an ultrasonic cleaning machine to prepare each ink.

{Composition of yellow ink}

Dye No. 1-1: 2.4 parts by weight

Dye No. 11-1: 3.6 parts by weight

Phenoxy resin ("PKHJ" manufactured by Union Carbide): 10 parts by weight

Tetrahydrofuran: 90 parts by weight

{Composition of magenta ink}

Dye No. VIII-1: 3.0 parts by weight

Dye No. VI-1: 2.0 parts by weight

Dye No. VI-2: 1.0 parts by weight

Phenoxy resin ("PKHJ" manufactured by Union Carbide): 10 parts by weight

Tetrahydrofuran: 90 parts by weight

{Composition of cyan ink}

Dye No. XI-1: 0.9 parts by weight

Dye No. X-1: 2.6 parts by weight

Dye No. XIII-1: 2.5 parts by weight

Phenoxy resin ("PKHJ" manufactured by Union Carbide): 10 parts by weight

Tetrahydrofuran: 90 parts by weight

The resulting ink was applied onto a polyethylene terephthalate film (6 $\mu$m thickness) by means of a wire bar and dried (dried layer thickness: about 1 $\mu$m) to form a color material layer. Then, a liquid including 10 parts by weight of an acrylic resin (Trade name: BR-80, manufactured by Mitsubishi Rayon Co., Ltd.), 1 part by weight of an amino-modified silicone oil (Trade name: KF393, Shinetsu Chemical Co., Ltd.), and 89 parts by weight of toluene was applied onto the rear side of the polyethylene terephthalate film and dried (dried layer thickness: about 1 $\mu$m) to form a heat-resistant resin layer, whereby a sheet for thermal transfer was obtained.

The resulting sheet for thermal transfer was connected to an ink ribbon of VM-MPA50 of a printer "NV-MPX5" manufactured by Matsushita Electric Industrial Co. Ltd., and a gradation image of yellow, magenta, cyan, red, green, blue, or black was recorded on VM-MPA50 recording paper by the printer "NV-MPX5" manufactured by Matsushita Electric Industrial Co. Ltd.

The color density of the resulting recorded product of yellow image was measured. The color density was measured using a spectrophotometer (Trade name: SPM-50, manufactured by Gretag).

A light resistance test of the obtained recorded products of seven colors (a gradation part of recording density of yellow image of about 1.0) was carried out (black panel temperature: 63±2° C.) by means of a xenon lamp fademeter (manufactured by Suga Shikenki K.K.), whereby the degree of color fading or change ($\Delta E(L^*a^*b^*)$) of the recorded products after irradiation for 80 hours was determined.

The results are as follows.

Maximum color density of yellow recording=2.0, Maximum color density of black recording=2.2, Light resistance ($\Delta E$) of yellow recording=2, Light resistance ($\Delta E$) of black recording=17, Light resistance ($\Delta E$) of red recording=8, Light resistance ($\Delta E$) of green recording=16.

From the above results, it is evident that the images obtainable by thermal transfer recording using a sheet set of the invention have totally excellent performance with an extremely high storing ability of recorded products, that is, gradation images of yellow, magenta, cyan, red, green, blue, and black can be recorded satisfactory and especially, high density clear yellow and black recorded products can be obtained with a low energy; and good results were obtained even in the cases of a yellow image and a black image though a high light resistance is hitherto difficult to obtain in these cases.

Example 7

Using inks prepared by the following method instead of the inks used in Example 6, preparation of thermal transfer sheets, transfer recording, and evaluation were carried out in the same manner as in Example 6. As a result, recording having a uniform color density could be obtained and it was confirmed that the resulting recorded products had a good light resistance.

{Composition of yellow ink}

Dye No. I-1: 2.4 parts by weight

Dye No. 11-1: 3.6 parts by weight

AS resin (Product name: Denka AS-S, manufactured by Denki

Kagaku Kogyo K.K.): 10 parts by weight

Toluene: 70 parts by weight

Cyclohexanone: 10 parts by weight

{Composition of magenta ink}

Dye No. VIII-1: 3.0 parts by weight

Dye No. VI-1: 2.0 parts by weight

Dye No. VI-2: 1.0 parts by weight

AS resin (Product name: Denka AS-S, manufactured by Denki Kagaku Kogyo K.K.):

10 parts by weight

Toluene: 70 parts by weight

Cyclohexanone: 10 parts by weight

{Composition of cyan ink}

Dye No. XI-1: 0.9 parts by weight

Dye No. X-1: 2.6 parts by weight

Dye No. XIII-1: 2.5 parts by weight

AS resin (Product name: Denka AS-S, manufactured by Denki

Kagaku Kogyo K.K.): 10 parts by weight

Toluene: 70 parts by weight

Cyclohexanone: 10 parts by weight

As is mentioned in detail in the above, the present invention provides an ink for thermal transfer and a sheet for thermal transfer having totally excellent performance in all the properties required for a dye for thermal transfer recording, exhibiting a high recording density, a clear color tone of recorded products, and a high stability of recorded products, and a thermal transfer recording method using the same. Especially, according to the invention, a thermal transfer recorded product showing a high density clear yellow color with a preferred hue of color tone as yellow color and having a remarkably good light resistance.

This application is based on Japanese patent applications No. 2001-339584 filed Nov. 5, 2001 and No. 2001-356289 filed Nov. 21, 2001, the entire contents of each of which being hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed is:

1. A thermal transfer ink, comprising:

at least one dye (a);

at least one dye selected from the group consisting of dye (b), dye (c) and a mixture thereof; and a medium;

wherein (a) is a dye having a pyrazolone methine skeleton and represented by formula (I):

(I)

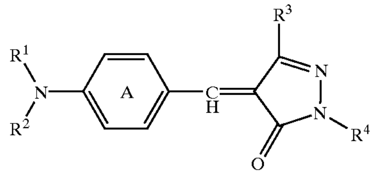

wherein ring A represents an optionally substituted benzene ring, $R^1$ and $R^2$ each independently represent a hydrogen atom, an optionally substituted alkyl group, allyl group, an optionally substituted aryl group, or an optionally substituted cycloalkyl group, $R^3$ represents a hydrogen atom, an optionally substituted alkyl group, an $NR^9R^{10}$ group, an optionally substituted alkoxy group, an optionally substituted alkoxycarbonyl group, an optionally substituted aryl group, or a $C(O)NR^{9A}R^{10A}$ group, $R^4$ represents an optionally substituted alkyl group or an optionally substituted aryl group, and $R^9$, $R^{10}$, $R^{9A}$, and $R^{10A}$ each independently represent a hydrogen atom, an optionally substituted alkyl group, or an optionally substituted aryl group, (b) is a dye having a quinophthalone skeleton and represented by formula (II):

(II)

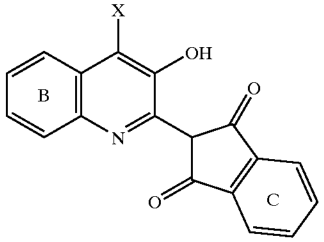

wherein rings B and C each independently represent an optionally substituted benzene ring, and X represents a hydrogen atom or a halogen atom, and (c) is a dye having an aminopyrazole azo skeleton and represented by formula (III):

(III)

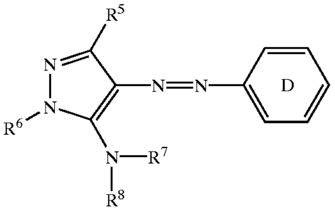

wherein ring D represents an optionally substituted benzene ring, $R^5$ represents a hydrogen atom, an optionally substituted alkyl group, an optionally substituted alkoxy group, an optionally substituted aryl group, an optionally substituted alkoxycarbonyl group, a $C(O)NR^{9B}R^{10B}$ group, or an $SO_2R^{9C}$ group, $R^6$ represents a hydrogen atom, an optionally substituted alkyl group, or an optionally substituted aryl group, $R^7$ and $R^8$ each independently represent a hydrogen atom or an optionally substituted alkyl group, and $R^{9B}$, $R^{10B}$, and $R^{9C}$ each independently represent a hydrogen atom, an optionally substituted alkyl group, or an optionally substituted aryl group.

2. The ink according to claim 1, wherein, in the pyrazolone methine dye represented by formula (I), ring A represents a benzene ring which is optionally substituted with one or more substituents selected from the group consisting of an optionally substituted alkyl group having 1 to 10 carbon atoms, an optionally substituted alkoxy group having 1 to 10 carbon atoms, and a halogen atom, $R^1$ and $R^2$ each independently represent an optionally substituted alkyl group having 1 to 12 carbon atoms, allyl group, an optionally substituted aryl group having 6 to 10 carbon atoms, or an optionally substituted cycloalkyl group having 5 to 7 carbon atoms, $R^3$ represents a hydrogen atom, an optionally substituted alkyl group having 1 to 10 carbon atoms, an $NR^9R^{10}$ group having 1 to 8 carbon atoms, an optionally substituted alkoxy group having 1 to 8 carbon atoms, an optionally substituted alkoxycarbonyl group having 2 to 9 carbon atoms, an optionally substituted aryl group having 6 to 10 carbon atoms, or a $C(O)NR^{9A}R^{10A}$ group having 3 to 9 carbon atoms, and $R^4$ represents an optionally substituted alkyl group having 1 to 12 carbon atoms or an optionally substituted aryl group having 6 to 10 carbon atoms.

3. The ink according to claim 1, wherein in the quinophthalone dye represented by formula (II), ring B represents a benzene ring which may be optionally substituted with one or more optionally substituted alkyl groups each independently having 1 to 8 carbon atoms, ring C represents a benzene ring which may be optionally substituted by with one or more substituents selected from the group consisting of an optionally substituted alkyl group having 1 to 10 carbon atoms, an optionally substituted alkoxy group having 1 to 12 carbon atoms, an optionally substituted aryl group having 6 to 10 carbon atoms, an optionally substituted aryloxy group having 6 to 10 carbon atoms, an optionally substituted $COOR^{9D}$ group having 2 to 11 carbon atoms, a $C(O)NR^{9E}R^{10E}$ group having 3 to 9 carbon atoms, and an $OC(O)R^{9F}$ group having 2 to 11 carbon atoms, wherein $R^{9D}$, $R^{9E}$ and $R^{10E}$ each independently represent a hydrogen atom, an optionally substituted alkyl group, or an optionally substituted aryl group, $R^{9F}$ represents a hydrogen atom, an optionally substituted alkyl group, an optionally substituted aryl group, an optionally substituted alkoxy group, an optionally substituted aryloxy group, or an optionally substituted NR*R** group, wherein R* and R** each independently represent a hydrogen atom, an optionally substituted alkyl group, or an optionally substituted aryl group.

4. The ink according to claim 1, wherein, in the aminopyrazole azo dye represented by formula (III), ring D represents a benzene ring which may be optionally substituted with one or more substituents selected from the group consisting of an optionally substituted alkyl group having 1 to 10 carbon atoms, an optionally substituted alkoxy group having 1 to 10 carbon atoms, a halogen atom, cyano group, nitro group, or a $COOR^{9G}$ group having 2 to 11 carbon atoms in which $R^{9G}$ represents a hydrogen atom, an optionally substituted alkyl group having 1 to 10 carbon atoms, or an optionally substituted aryl group having 6 to 10 carbon atoms, $R^5$ represents a hydrogen atom, an optionally substituted alkyl group having 1 to 10 carbon atoms, an optionally substituted alkoxy group having 1 to 10 carbon atoms, an optionally substituted aryl group having 6 to 19 carbon atoms, an optionally substituted alkoxycarbonyl group having 2 to 10 carbon atoms, a $C(O)NR^{9B}R^{10B}$ group having 2 to 9 carbon atoms, or an $SO_2R^{9C}$ group having 1 to 8 carbon atoms, wherein $R^{9B}$, $R^{10B}$, and $R^{9C}$ each independently represent a hydrogen atom, an optionally substituted alkyl group having 1 to 10 carbon atoms, or an optionally substituted aryl group having 6 to 10 carbon atoms, $R^6$ represents an optionally substituted alkyl group having 1 to 10 carbon atoms or an optionally substituted aryl group having 6 to 10 carbon atoms, and $R^7$ and $R^8$ each independently represent a hydrogen atom or an optionally substituted alkyl group having 1 to 10 carbon atoms.

5. The ink according to claim 1, wherein the ink is a yellow ink.

6. A thermal transfer sheet, comprising:

a substrate, and on the substrate, a color material layer comprising:

a binder;

at least one dye (a); and at least one dye selected from the group consisting of dye (b), dye (c) and a mixture thereof; wherein (a) is a dye having a pyrazolone methine skeleton and represented by formula (I):

(I)

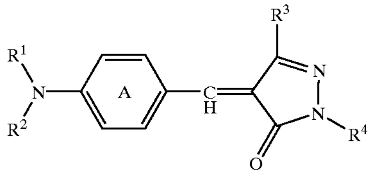

wherein ring A represents an optionally substituted benzene ring, $R^1$ and $R^2$ each independently represent a hydrogen atom, an optionally substituted alkyl group, allyl group, an optionally substituted aryl group, or an optionally substituted cycloalkyl group, $R^3$ represents a hydrogen atom, an optionally substituted alkyl group, an $NR^9R^{10}$ group, an optionally substituted alkoxy group, an optionally substituted alkoxycarbonyl group, an optionally substituted aryl group, or a $C(O)NR^{9A}R^{10A}$ group, $R^4$ represents an optionally substituted alkyl group or an optionally substituted aryl group, and $R^9$, $R^{10}$, $R^{9A}$, and $R^{10A}$ each independently represent a hydrogen atom, an optionally substituted alkyl group, or an optionally substituted aryl group, (b) is a dye having a quinophthalone skeleton and represented by formula (II):

(II)

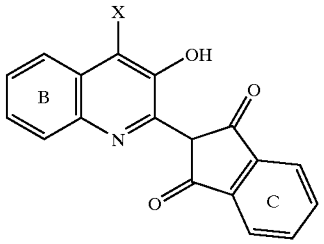

wherein rings B and C each independently represent an optionally substituted benzene ring, and X represents a hydrogen atom or a halogen atom, and (c) is a dye having an aminopyrazole azo skeleton and represented by formula (III):

(III)

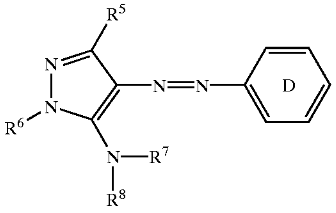

wherein ring D represents an optionally substituted benzene ring, $R^5$represents a hydrogen atom, an optionally substituted alkyl group, an optionally substituted alkoxy group, an optionally substituted aryl group, an optionally substituted alkoxycarbonyl group, a $C(O)NR^{9B}R^{10B}$ group, or an $SO_2R^{9C}$ group, $R^6$ represents a hydrogen atom, an optionally substituted alkyl group, or an optionally substituted aryl group, $R^7$ and $R^8$ each independently represent a hydrogen atom or an optionally substituted alkyl group, $R^{9B}$, $R^{10B}$, and $R^{9C}$ each independently represent a hydrogen atom, an optionally substituted alkyl group, or an optionally substituted aryl group.

7. The sheet according to claim 6, wherein, in the pyrazolone methine dye represented by formula (I), ring A represents a benzene ring which is optionally substituted with one or more substituents selected from the group consisting of an optionally substituted alkyl group having 1 to 10 carbon atoms, an optionally substituted alkoxy group having 1 to 10 carbon atoms, and a halogen atom, $R^1$ and $R^2$ each independently represent an optionally substituted alkyl group having 1 to 12 carbon atoms, allyl group, an optionally substituted aryl group having 6 to 10 carbon atoms, or an optionally substituted cycloalkyl group having 5 to 7 carbon atoms, $R^3$ represents a hydrogen atom, an optionally substituted alkyl group having 1 to 10 carbon atoms, an $NR^9R^{10}$ group having 1 to 8 carbon atoms, an optionally substituted alkoxy group having 1 to 8 carbon atoms, an optionally substituted alkoxycarbonyl group having 2 to 9 carbon atoms, an optionally substituted aryl group having 6 to 10 carbon atoms, or a $C(O)NR^{9A}R^{10A}$ group having 3 to 9 carbon atoms, and $R^4$ represents an optionally substituted alkyl group having 1 to 12 carbon atoms or an optionally substituted aryl group having 6 to 10 carbon atoms.

8. The sheet according to claim 6, wherein in the quinophthalone dye represented by formula (II), ring B represents a benzene ring which may be optionally substituted with one or more optionally substituted alkyl groups each independently having 1 to 8 carbon atoms, ring C represents a benzene ring which may be optionally substituted by with one or more substituents selected from the group consisting of an optionally substituted alkyl group having 1 to 10 carbon atoms, an optionally substituted alkoxy group having 1 to 12 carbon atoms, an optionally substituted aryl group having 6 to 10 carbon atoms, an optionally substituted aryloxy group having 6 to 10 carbon atoms, an optionally substituted $COOR^{9D}$ group having 2 to 11 carbon atoms, a $C(O)NR^{9E}R^{10E}$ group having 3 to 9 carbon atoms, and an $OC(O)R^{9F}$ group having 2 to 11 carbon atoms, wherein $R^{9D}$, and $R^{9E}$ and $R^{10E}$ each independently represent a hydrogen atom, an optionally substituted alkyl group, or an optionally substituted aryl group, $R^{9F}$ represents a hydrogen atom, an optionally substituted alkyl group, an optionally substituted aryl group, an optionally substituted alkoxy group, an optionally substituted aryloxy group, or an optionally substituted NR*R** group, wherein R* and R** each independently represent a hydrogen atom, an optionally substituted alkyl group, or an optionally substituted aryl group.

9. The sheet according to claim 6, wherein, in the aminopyrazole azo dye represented by formula (III), ring D represents a benzene ring which may be optionally substituted with one or more substituents selected from the group consisting of an optionally substituted alkyl group having 1 to 10 carbon atoms, an optionally substituted alkoxy group having 1 to 10 carbon atoms, a halogen atom, cyano group, nitro group, or a $COOR^{9G}$ group having 2 to 11 carbon atoms in which $R^{9G}$ represents a hydrogen atom, an optionally substituted alkyl group having 1 to 10 carbon atoms, or an optionally substituted aryl group having 6 to 10 carbon atoms, $R^5$ represents a hydrogen atom, an optionally substituted alkyl group having 1 to 10 carbon atoms, an optionally substituted alkoxy group having 1 to 10 carbon atoms, an optionally substituted aryl group having 6 to 19 carbon atoms, an optionally substituted alkoxycarbonyl group having 2 to 10 carbon atoms, a $C(O)NR^{9B}R^{10B}$ group having 2 to 9 carbon atoms, or an $SO_2R^{9C}$ group having 1 to 8 carbon atoms, wherein $R^{9B}$, $R^{10B}$, and $R^{9C}$ each independently represent a hydrogen atom, an optionally substituted alkyl group having 1 to 10 carbon atoms, or an optionally substituted aryl group having 6 to 10 carbon atoms, $R^6$ represents an optionally substituted alkyl group having 1 to 10 carbon atoms or an optionally substituted aryl group having 6 to 10 carbon atoms, and $R^7$ and $R^8$ each independently represent a hydrogen atom or an optionally substituted alkyl group having 1 to 10 carbon atoms.

10. A thermal transfer recording method, comprising thermally transferring dye from the sheet according to claim 6 to an image-receiving sheet.

11. The method according to claim 10, further comprising producing a recorded image having an a* value of −13 to 10 and a b* value of 60 or more in CIELAB space at a color density of 1.0 at a 2° sight angle setting and using a D50 light source.

12. A thermal transfer sheet set, comprising:

at least one substrate;

a yellow color material layer on said substrate; and on said substrate, or on separate substrates:

a magenta color material layer and a cyan color material layer, wherein each color material layer comprises at least one thermally transferable dye and a binder;

wherein the thermally transferable dye in the yellow color material layer comprises:

at least one dye (a), and at least one dye selected from the group consisting of dye (b), dye (c) and a mixture thereof, wherein (a) is a dye having a pyrazolone methine skeleton and represented by formula (I):

(I)

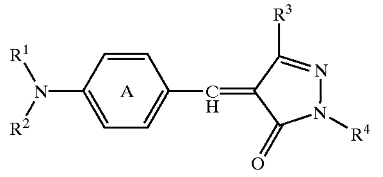

wherein ring A represents an optionally substituted benzene ring, $R^1$ and $R^2$ each independently represent a hydrogen atom, an optionally substituted alkyl group, allyl group, an optionally substituted aryl group, or an optionally substituted cycloalkyl group, $R^3$ represents a hydrogen atom, an optionally substituted alkyl group, an $NR^9R^{10}$ group, an optionally substituted alkoxy group, an optionally substituted alkoxycarbonyl group, an optionally substituted aryl group, or a $C(O)NR^{9A}R^{10A}$ group, $R^4$ represents an optionally substituted alkyl group or an optionally substituted aryl group, and $R^9$, $R^{10}$, $R^{9A}$, and $R^{10A}$ each independently represent a hydrogen atom, an optionally substituted alkyl group, or an optionally substituted aryl group, (b) is a dye having a quinophthalone skeleton and represented by formula (II):

(II)

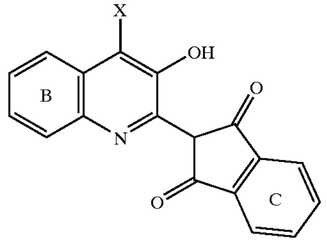

wherein rings B and C each independently represents an optionally substituted benzene ring, and X represents a hydrogen atom or a halogen atom; and (c) is a dye having an aminopyrazole azo skeleton and represented by formula (III):

(III)

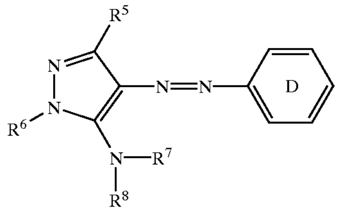

wherein ring D represents an optionally substituted benzene ring, $R^5$ represents a hydrogen atom, an optionally substituted alkyl group, an optionally substituted alkoxy group, an optionally substituted aryl group, an optionally substituted alkoxycarbonyl group, a $C(O)NR^{9B}R^{10B}$ group, or an $SO_2R^{9C}$ group, $R^6$ represents a hydrogen atom, an optionally substituted alkyl group, or an optionally substituted aryl group, $R^7$ and $R^8$ each independently represent a hydrogen atom or an optionally substituted alkyl group, $R^{9B}$, $R^{10B}$, and $R^{9C}$ each independently represent a hydrogen atom, an optionally substituted alkyl group, or an optionally substituted aryl group;

wherein the thermally transferable dye in the magenta color material layer comprises at least one dye selected from the group consisting of dyes represented by the following formulae (IV) to (IX) and combinations thereof;

and wherein the thermally transferable dye in the cyan color material layer comprises at least one dye selected from the group consisting of dyes represented by the following formulae (X) to (XIV) and combinations thereof:

(IV)

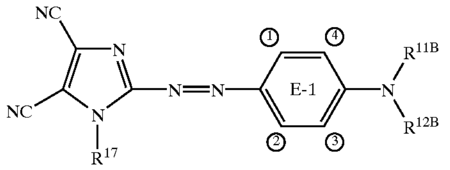

(V)

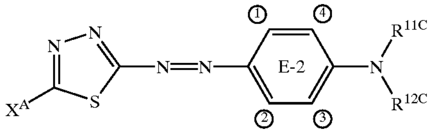

(VI)

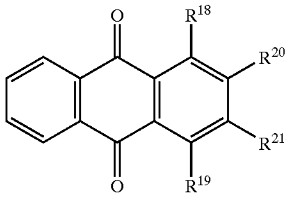

(VII)

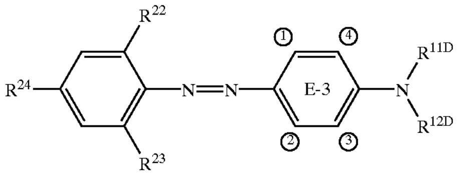

(VIII)

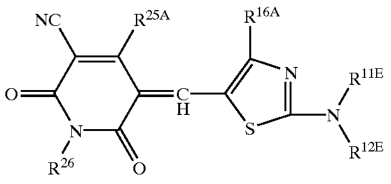

(IX)

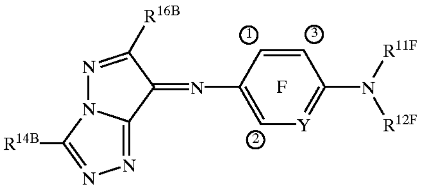

-continued (X)

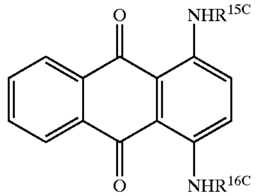

(XI)

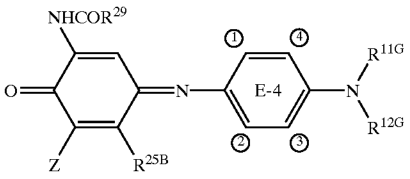

(XII)

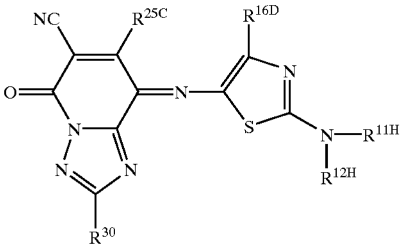

(XIII)

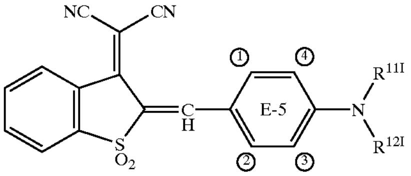

(XIV)

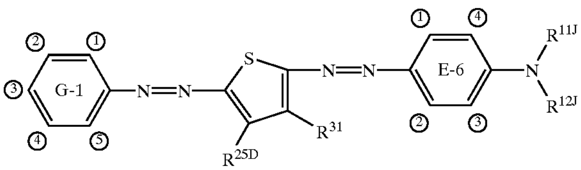

wherein rings E-1 to E-6 and G-1 each represent an optionally substituted benzene ring, ring F represents an optionally substituted benzene ring or an optionally substituted pyridine ring, $R^{11B}$ to $R^{11J}$ and $R^{12B}$ to $R^{12J}$ each independently represent a hydrogen atom, an optionally substituted alkyl group, an allyl group, an optionally substituted aryl group, or an optionally substituted cycloalkyl group, $R^{14B}$ represents an optionally substituted alkyl group or an optionally substituted aryl group, $R^{15C}$ and $R^{16A}$ to $R^{16D}$ each independently represent a hydrogen atom, an optionally substituted alkyl group, or an optionally substituted aryl group, $R^{17}$ represents a hydrogen atom, an optionally substituted alkyl group, an allyl group, or an optionally substituted aryl group, $R^{18}$ and $R^{19}$ each independently represent an amino group or hydroxy group, $R^{20}$ and $R^{21}$ each independently represent a hydrogen atom or an optionally substituted aryloxy group, $R^{22}$ and $R^{23}$ each independently represent a cyano group, nitro group, an optionally substituted alkyl group, a halogen atom, or a hydrogen atom, $R^{24}$ represents a hydrogen atom, nitro group, or an optionally substituted alkyl group, $R^{25A}$ to $R^{25D}$ each independently represent a hydrogen atom or an optionally substituted alkyl group, $R^{26}$ represents an optionally substituted alkyl group, an optionally substituted cycloalkyl group, or an $NR^{27}R^{28}$ group in which $R^{27}$ and $R^{28}$ each independently represents an optionally substituted alkylcarbonyl group or an optionally substituted arylcarbonyl group, $R^{29}$ represents an optionally substituted alkyl group, an optionally substituted alkoxy group, an optionally substituted aryl group, or an optionally substituted aryloxy group, $R^{30}$ represents an optionally substituted alkyl group, an optionally substituted aryl group, or hydroxy group, $R^{31}$ represents cyano group, a $COOR^{15G}$ group, or a $CONR^{15H}R^{16H}$ group in which $R^{15G}$, $R^{15H}$ and $R^{16H}$ each independently represents a hydrogen atom, an optionally substituted alkyl group, or an optionally substituted aryl group, $X^A$ represents an $SR^{16H}$ group, an $S(O)R^{14D}$ group, or an $SO_2R^{14E}$ group in which $R^{14C}$ to $R^{14E}$ each independently represents an optionally substituted alkyl group or an optionally substituted aryl group, Y represents CH group or N, and Z represents a hydrogen atom or a halogen atom.

13. The sheet set according to claim 12, wherein the yellow, magenta and cyan color material layers are disposed side by side on a single substrate.

14. The sheet set according to claim 12, wherein each of the yellow, magenta, and cyan color layers are disposed on separate substrates.

15. A full color printing method, which comprises carrying out full color thermal transfer dye from the sheet set according to claim 12 to at least one support.

* * * * *